United States Patent
DeMarco

(10) Patent No.: US 10,362,105 B1
(45) Date of Patent: Jul. 23, 2019

(54) GENERATING PROBALISTIC DATA STRUCTURES IN GOSSIP PROTOCOLS

(71) Applicant: Amazon Technologies, Inc., Seattle, WA (US)

(72) Inventor: Paul Derek DeMarco, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 164 days.

(21) Appl. No.: 15/665,169

(22) Filed: Jul. 31, 2017

(51) Int. Cl.
    *G06F 9/54* (2006.01)
    *G06F 16/22* (2019.01)
    *H04L 29/08* (2006.01)

(52) U.S. Cl.
    CPC .......... *H04L 67/1065* (2013.01); *G06F 9/546* (2013.01); *G06F 16/2291* (2019.01); *H04L 67/1076* (2013.01)

(58) Field of Classification Search
None
See application file for complete search history.

(56) References Cited

U.S. PATENT DOCUMENTS

| | | | |
|---|---|---|---|
| 8,589,574 B1 | 11/2013 | Cormie et al. | |
| 2003/0115301 A1* | 6/2003 | Koskimies | H04L 29/06 709/221 |
| 2006/0146791 A1* | 7/2006 | Deb | H04L 1/0041 370/352 |
| 2007/0156842 A1* | 7/2007 | Vermeulen | H04L 67/42 709/217 |
| 2008/0313188 A1* | 12/2008 | Hu | H04L 67/14 |
| 2012/0036187 A1* | 2/2012 | Luboshitz | H04L 67/104 709/204 |
| 2014/0259005 A1* | 9/2014 | Jeffrey | G06F 8/65 717/173 |
| 2018/0159717 A1* | 6/2018 | Cormie | G06F 3/0607 |
| 2018/0165343 A1* | 6/2018 | Fan | H04W 4/06 |

OTHER PUBLICATIONS

Adam Kirsch, et al., "Building a Better Bloom Filter," Computer Science Group, Harvard Univ., Cambridge, MA, TR-02-05, 2005, pp. 1-33.
Abhinandan Das, et al., "SWIM: Scalable Weakly-consistent Infection-style Process Group Membership," Jun. 23-26, 2002, added to IEEE Dec. 10, 2002, pp. 1-10.

* cited by examiner

*Primary Examiner* — Brian Whipple
(74) *Attorney, Agent, or Firm* — Robert C. Kowert; Meyertons, Hood, Kivlin, Kowert & Goetzel, P.C.

(57) ABSTRACT

Systems and methods are disclosed to implement a gossip protocol to synchronize data in among nodes of a distributed computing system. During a round of the gossip protocol, a first node generates a space-efficient probabilistic data structure (SEPDS) from its data set. The SEPDS is generated using a set of hash functions that changes from round to round. The set of hash functions may be derived using two base hash functions without reliance on the use of any randomizing operations, and the result of each hash function may be assigned to modify a different portion of the SEPDS. The generated SEPDS is sent to a second node, which performs probabilistic queries on the SEPDS to compare the contents of its own data set with the SEPDS. Any data items that are missing from the SEPDS are sent back to the first node, which updates its data set accordingly.

20 Claims, 13 Drawing Sheets base hash functions 310

$\{H_1, H_2\} \rightarrow \{0, 1, 2, \ldots p-1\}$ hash function set 320

$\{g_0, g_1, g_2, \ldots g_i, \ldots g_{k-1}\}$
where $g_i = H_1 + i * H_2 \mod p$ hash function rotation schedule 330

| gossip round 335 | function A 230 | function B 232 | function C 234 |
|---|---|---|---|
| ⋮ | | | |
| 147 | $g_4$ | $g_2$ | $g_{15}$ |
| 148 | $g_5$ | $g_{12}$ | $g_1$ |
| 149 | $g_6$ | $g_0$ | $g_8$ |
| 150 | $g_{10}$ | $g_7$ | $g_0$ |
| ⋮ | | | |

GENERATING PROBALISTIC DATA STRUCTURES IN GOSSIP PROTOCOLS

BACKGROUND

Large-scale distributed computing systems often synchronize certain data among different nodes of the system. For example, some systems may use a gossip protocol to synchronize local data maintained on each node, such as cluster membership or node state information. In such a protocol, a node may regularly gossip with other nodes about the data so that a synchronized state of the data may be reached among the nodes after a certain period of time. However, depending on the number of nodes in the system and the size and frequency of gossip communications, the gossip protocol may impose a substantial burden on the system in terms of network load. It is thus generally desirable to improve such gossip protocols to achieve synchronization more quickly without imposing an excessive load on the system's network.

Figure 1:
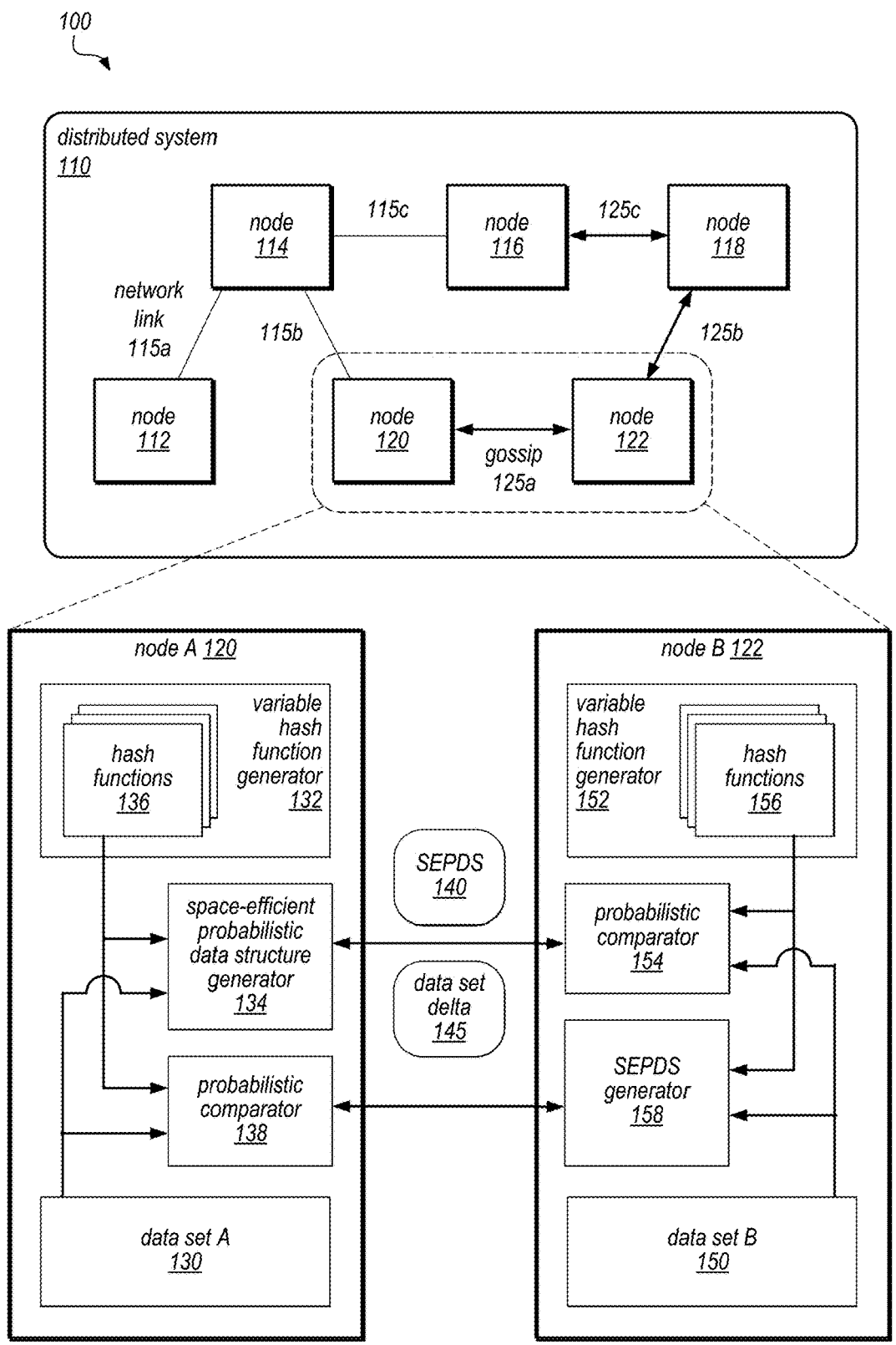
FIG. 1 is a block diagram illustrating an example distributed computing system that implements a gossip protocol that employs changing probabilistic data structure generation functions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a gossip protocol to synchronize data among nodes of a distributed computing system. In embodiments, a node in the distributed computing system may generate a space-efficient probabilistic data structure (SEPDS) from the node's local data, and share the SEPDS with a second node. The SEPDS may be generated using a set of hash functions that change from one gossip round to the next, so as to reduce the effect of errors associated with the use of the SEPDS.

Gossip protocols may be used to synchronize data across different nodes in a distributed system. For example, some distributed computing systems may use a gossip protocol to synchronize data such as cluster membership or node state information. In such a protocol, a node may occasionally gossip with other nodes about the data so that a synchronized state of the data is reached among the nodes after a certain number of gossip rounds. However, depending on the number of nodes in the system and the size and frequency of gossip communications, the gossip protocol may impose a substantial network load on the system. In some systems, the limitations of the system's network may mean that synchronization is achieved more slowly than desired.

To deal such problems, embodiments of systems and methods as disclosed herein may encode the local data of a node into a space-efficient probabilistic data structure (SEPDS), such as a bloom filter. For example, a set of data items maintained by the node may all be inserted into a bloom filter using a set of hash functions, such that the resulting bloom filter is much smaller in size than the actual data set. The SEPDS may be examined by a second node using the same hash functions, to determine if the second node's data item are present in the first node's data set. However, because the SEPDS is created using a compression technique, some information is lost during the creation process. Thus, the later examination of the SEPDS will generally include some probability of error. For example, in the case of bloom filters, queries of these structures may occasionally return "false positives," where a data item is seen to be present in the bloom filter, when it is not actually in the original data set. When they occur, these errors may lead to incorrect behavior during the synchronization process, for example an incomplete synchronization of the data between two gossiping nodes.

Accordingly, as discussed herein, the effect of such errors may be lessened over multiple rounds of gossip, by varying the manner in which the SEPDS is generated from round to round. For example, bloom filters may be generated using different hash functions in each round, so that it is extremely improbable that the same false positive error will occur in multiple rounds. Accordingly, the combination of these techniques may be used to implement a gossip protocol that is at the same time highly space-efficient and less error-prone.

However, it is computationally costly to generate a large number of random hash functions that are appropriate for use to construct SEPDSs. For example, each bloom filter relies a different set of independent hash functions. To quickly and efficiently generate these hash functions, as discussed herein, the system may derive the set of hash functions from two or more base hash functions by combining the base hash functions using simple arithmetic operations. Properly implemented, hash functions constructed in this manner perform no worse than randomly generated hash functions. Thus, the system may avoid the use of costly randomizing operations to generate hash functions for each round of the gossip protocol. These and other benefits and features of the inventions are described in further detail below in connection with the figures.

FIG. 1 is a block diagram illustrating an example distributed computing system that implements a gossip protocol that employs changing probabilistic data structure generation functions, according to some embodiments. As shown, the figure depicts an example distributed system 110 that includes six nodes 112, 114, 116, 118, 120, and 122. These nodes may be implemented as individual computers that are connected via a network. In some embodiments, the nodes may comprise different cores of a multicore processor. In some embodiments, the nodes may comprise a series of devices, such as instruments or sensors, that are kept in sync using a data synchronization protocol. The network connecting the nodes may be any type of data network capable of supporting a synchronization protocol, for example a local or wide area network. For example, as illustrated in the figure, some of the nodes may be connected pairwise via network links such as links 115a, 115, and 115c. Depending on the embodiment, such network links may be wired or wireless.

As shown, the distributed system 110 may implement a gossip protocol to synchronize local data maintained by each node. For example, as shown, nodes 120 and 122 may maintain datasets A 130 and B 150, respectively, which may be kept in sync via the gossip protocol. A gossip protocol is a peer-to-peer communication protocol that may be used in a distributed computing system to achieve a variety of goals. In some embodiments, the gossip protocol may be used to synchronize data among nodes of a distributed system. Gossip protocols are useful in contexts where communication among nodes is difficult to carry out, for example in a network that has an inconvenient structure or extremely large, or because gossip solutions are the most efficient ones available.

In some embodiments, the gossip protocol may be implemented in multiple gossip rounds. During each round, some nodes in the distributed system may randomly select another node (or multiple other nodes) to gossip with. For example, as shown in FIG. 1, nodes 120 and 122 may be engaged in a gossip 125a during a gossip round. As illustrated, multiple other nodes (e.g. 116 and 118) may be engaged in gossip (e.g. 125b and 125c) with other nodes in the distributed system 110. As may be understood, these gossip messages 125a-c may be used to synchronized data among the nodes. In some embodiments, the gossip may be unilateral, where one node only transmits information to another. In some embodiments, as shown, the gossip may be bilateral, where the two nodes exchange information by both sending and receiving messages. Once the information is exchanged via the gossip 125a, nodes 120 and 122 may gossip with other nodes in the distributed system 110 in a next gossip round, so as to pass on any information learned via gossip 125a, and receive information from the other gossiping nodes. Thus, the power of gossip protocols lies in the robust spread of information. Sooner or later, any new piece of information will be spread throughout all of the nodes.

As shown, in some embodiments, the nodes may include a number of modules to implement a gossip protocol that employs probabilistic data structures. For example, as shown, node A 120 and node B 122 may gossip using a space-efficient probabilistic data structure (SEPDS) 140. The SEPDS 140 may be generated from node A 120's data set A 130, which may include multiple data items. The data items in data set A 130 may be inserted into the SEPDS 140 using a SEPDS generator 134. The SEPDS generator 134 may generate the SEPDS 140 such that the SEPDS 140 is much smaller in size than the actual data set A 130. Further, the SEPDS 140 may support a probabilistic query of the data set A 130. That is, the SEPDS 140 may be used to check if a particular data item is present in the data set A 130. However, because SEPDS 140 is created using a data compression technique, some information may be lost, and thus the probabilistic queries may an incorrect query result for some percentage of queries. Thus, use of the SEPDS 140 represents a tradeoff between a size reduction in the gossip messages and that probability that an error may occur with the gossip communication.

Depending on the embodiment, the SEPDS generator 134 may generate different types of SEPDS 140. In some embodiments, the SEPDS 140 may be a bloom filter. To create a bloom filter, the data items in the data set A 130 may each be hash using a set of hash functions 136. Each hash function 136 may hash the data item (e.g. the data item's unique identifier) to a location index in the bloom filter. Thus, in some embodiments, the bloom filter may comprise a bit vector, where each location in the vector indicates a 0 or a 1. Once the data item is hashed by each of the hash functions 136, the resulting locations in the bloom filter are set to 1, so that a signature of that data item is encoded into the bloom filter. This process is then repeated for all data items that are to be added to the bloom filter.

As may be understood, in some cases, two data items may be encoded using the same bits in the bloom filter. Such occurrences may be referred to as a "collision" and represents a form of information loss. When the bloom filter is later used to determine if a data item is present in the data set, the same hash functions are used to generate the location indexes for the item being checked, and the resulting locations are checked in the bloom filter to see if they are all 1's. If not, the item in question is definitely not in the bloom filter. If so, the query results in a positive finding. However, the positive finding may represent a "false positive," because the bits for that item in the bloom filter may be set by a combination of other items. This situation thus represents a form of error that is associated with the bloom filter. As the number of bit collisions in a bloom filter increases, the probability of false positives also increases.

Although the discussions of this disclosure will primarily involve bloom filters as the SEPDS, a person of ordinary skill in the art would understand that other types of SEPDS may also be used. In general, a SEPDS may encode a set of data items into a space efficient structure that is smaller in size than the original set, so that the SEPDS may be used to answer probabilistic queries about whether particular data items are present in the set. Different types of SEPDS may be used in connection with the embodiments discussed herein without departing from the spirit of the inventions.

For example, in some embodiments, another type of SEPDS called a Cuckoo filter may be used. A Cuckoo filter operates by hashing an entry with a hash function, and inserting a resulting small fingerprint of the entry into an open position in one of two or more alternate buckets in the SEPDS structure. The two or more alternate buckets may be determined via hash functions. When all of alternate buckets for a new entry are full, the filter recursively kicks existing entries to their alternate buckets until space is found or attempts are exhausted. Lookups repeat the hash function and check the alternate buckets for the fingerprint. When a matching fingerprint is not found, the entry is definitely not in the filter. When a matching fingerprint is found in a bucket, the entry might be in the filter. False positives occur when another entry inserted a matching fingerprint into any of the checked buckets. Because the Cuckoo filter stores the small fingerprint for each data items, this SEPDS will be larger in size than the classic bloom filter.

As another example, in some embodiments, another type of SEPDS called a quotient filter may be used. In a quotient filter, one or more hash functions may be used to generate a p-bit fingerprint for a data item. The fingerprint is then divided into a quotient Q (e.g., the q most significant bits) and a remainder R (e.g., the r least significant bits). The insertion algorithm will attempt to store the remainder value R in a slot Q in the quotient filter, which may be referred to as the canonical slot. If the canonical slot is occupied then the remainder may be stored in some slot to the right. Thus, the insertion algorithm results in a situation where all items having the same quotient are stored in a contiguous slot called a "run." The insertion process also sets a number of metadata bits to record the moving of the data items as a result of collisions. For example, some embodiments use three flags for each slot. An "is occupied" flag is set when a slot is the canonical slot for some item stored (somewhere) in the filter (but not necessarily in this slot). An "is continuation" flag is set when a slot is occupied but not by the first remainder in a run. And an "is shifted" flag is set when the remainder in the slot is not in its canonical slot. Using these flags, a lookup algorithm may be implemented on the quotient filter to quickly determine if an item is in the quotient filter (e.g., by scanning the item's quotient's run). If the matching fingerprint is not found, then the item is definitely not in the filter. If the matching fingerprint is found, then the item might be in the filter (i.e., the structure may produce false positives). Depending on the embodiment, the quotient filter structure may require more space than the Cuckoo filter or bloom filter, because of the fingerprints and the metadata overhead. However, in some cases, the quotient filter may do a better job of avoiding collisions in the structure, thus reducing both the size of the structure and the probability of false positives.

As shown, after the SEPDS 140 is generated, node A 120 may send the SEPDS 140 to node B 122 during a gossip round, which may use the SEPDS 140 to perform a probabilistic compare of its own data set B 150 with the contents seen in the SEPDS 140. To do this, node B 122 may implement a probabilistic comparator 154, which may perform individual probabilistic queries on the SEPDS 140 by hashing each of the data items in its data set B 150, and checking to see if that item's signature is apparently present in the SEPDS. The hashing may be performed using hash functions 156, which are the same functions are hash functions 136 used by node A 120. In some embodiments, as a shortcut, node B 122 may generate a SEPDS of its own (not shown) from its own data set B 150, and perform an initial bit compare of its own SEPDS with the received SEPDS 140. In some embodiments, node B 122 may generate its own SEPDS anyways, because it may also act as an initiator of a gossip communication to another node during a gossip round. Thus, in the common case where node A 120 and node B 122 contains exactly the same data items in their respective data sets, this shortcut will quickly confirm that no synchronizing needs to be performed between the two nodes.

In some cases, node B 122 may discover from its probabilistic comparator 154 that it has some data items in its data set B 150 that is missing from the SEPDS 140 received from node A 120. In this situation, node B 122 may generate a data set delta 145 which includes the missing data items, and send this delta 145 back to node A 120. In some embodiments, this transmission may be kept as small as possible so that it does not generate excessive network traffic. In some embodiments, the delta 145 may be compressed before it is sent. In some embodiments, the delta 145 may be sent at a random time during the gossip round interval, so that the distributed system 110 does not experience a spike in network usage from all of the nodes gossiping in unison.

Once the data set delta 145 is received by node A 120, it may be fed to a data set updater on node A, which may unpackage the delta and apply the delta as updates to its own data set A 130. In this fashion, data set A 130 will include all of the data items that are present in data set B 150, except any items that were masked as a result of false positives in the SEPDS 140.

In some embodiments, the two nodes 120 and 122 may perform a bilateral gossip, where each side generates sends the other its own SEPDS, so that at the end of the gossip interaction, both nodes have approximately the same set of data items, not including any items that were missed due to false positives. As shown, for example, node B 122 may include its own SEPDS generator 158, and node A 120 may include its own probabilistic comparator 138. Thus, the two nodes may perform a symmetrical process by exchanging two SEPDSs, which may be generated using the same hash functions used for that gossip round. In some embodiments, the two nodes may implement an initial step where the two SEPDSs are first compared using a bit-compare. In the common case that the two are completely identical, the nodes may determine that data sets A and B are sufficiently synchronized, and thus complete the gossip communication for that round.

As will be appreciated, the probability of false positives generally reduces the performance of the gossip protocol. Thus, to reduce this probability over multiple rounds of the gossip protocol, the manner in which the SEPDS 140 is generate may be changed, so that a false positive that occurs with the SEPDS in one round is highly unlikely to occur in successive rounds. In some embodiments, this may be accomplished by changing the set of hash functions, for example hash functions 136 and 156, that are used to generate the SEPDSs, from round to round.

In some embodiments, the changing of the hash functions may be performed by variable hash function generators 132 and 152, which may be present in all gossiping nodes. As the hash functions 136 and 156 change from round to round, they should be the same between at least the two gossip nodes, for example node A 120 and node B 122. The functions may be kept the same by using a deterministic variable hash function generator that generates the same set of hash function for all nodes, from round to round. For example, the generator may generate the set of hash functions based on only a gossip round identifier, or the current time, which is agreed upon by all nodes in the gossip protocol. In some embodiments, the hash functions may be generated by one node, and send to the second node as part of the initial gossip message, including the SEPDS 140. In such embodiments, different pairs of gossiping nodes may use a different set of hash functions in a given round. In some embodiments, a schedule of hash functions to be used in the gossip protocol may be determined by a master source (e.g., a master node elected for this purpose), and the schedule may be distributed to the nodes in the distributed system. In some embodiments, the schedule itself may be distributed using the gossip protocol.

In some embodiments, the variable hash function generator 132 and 152 may generate the set hash functions 136 and 156 from an algorithm that allows hash functions to be quickly obtained without the use of costly randomization operations. For example, in some embodiments, the variable hash function generators may derive the set of hash functions using an algorithm that combines two or more base hash functions using simple arithmetic operations. The derivation may add the first base hash function to a product of the second base hash function and a coefficient, which is different for each hash function. In some embodiments, each of the hash functions may be assigned to a disjoint portion of the SEPDS, so that its results only modify its assigned portion of the SEPDS. In this manner, it may be shown that the SEPDS produced by such a set of hash functions perform no worse (in terms of the rate of false positives) than a set of hash functions generated completely randomly. However, this generation algorithm is much less costly than the random generation of a set of hash functions, as it avoids a large number of randomizing operations. Only two initial base hash functions need to be generated using randomizing operations. In some embodiments, the base hash functions are generated by a master source, and the base functions may be propagated to the nodes in the system via the gossip protocol. In some embodiments, the master source may generate a schedule of these base functions (e.g., which base functions to use for each round), and distribute the schedule to all nodes in the system.

As may be appreciated by those skilled in the art, the distributed system 110 as illustrated in FIG. 1 may be used in a variety of applications to synchronize many different kinds of information among nodes of the system. For example, in some embodiments, the gossip protocol may be used to synchronize the current membership information of a cluster. In such embodiments, the membership of the cluster may be maintained as a data set by each of the nodes, and as nodes join and leave the cluster, these membership changes may be gradually propagated to other nodes in the cluster via the gossip protocol. In some embodiments, the data set may include node status change events, which may include join events, leave events, node failure events, node status changes, among other types of events. Thus, any relevant node status change may be propagated to the entire cluster via the gossip protocol.

In some embodiments, the information about nodes in the data set may include node health information. In some embodiments, such node health information may include recently seen heartbeats generated by each node. In some embodiments, the heartbeat produced by a node may include the general health information about the node, and the heartbeat may be sent to only one or a few other members of the cluster. The heartbeat may then be propagated to the rest of the cluster via the gossip protocol. For example, a gossip round may occur for every 10 heartbeats. The gossip may be implemented by software agents that are running on each node that carry out specific tasks. For example, the gossip protocol may be implemented by a daemon process on each node that generates heartbeat information and collects heartbeat information from other nodes.

In some embodiments, the data items in the data set may indicate different versions of nodes. For example, node change events may be associated with a particular version number of the node, and as the node changes, its version number also changes. In such embodiments, the gossip protocol may be implemented so that if a difference is detected between the data sets of two nodes, the second node may send only a delta of differences to the first node in terms of version numbers. For example, node B 122 may receive a SEPDS 140 from node A 120, and detect that node A is not aware of the latest version of node C (e.g., version 4). Node B 122 may then determine from the SEPDS 140 that node A is aware of version 2 of node C. Thus, node B may send only a delta to node A that includes versions 3 and 4 of node C, as opposed to all information about node C. This thus reduces the amount of information that needs to be sent over the network to perform the synchronization.

In some embodiments, to further reduce the data that is exchanged during the gossip protocol, the nodes may limit the synchronization process to only a subset of data items in its data set. Thus, for example, node A 120 may generate the SEPDS 140 only from a subset of most recent data items or events in its data set 130, and node B 122 may only examine the SEPDS for its most recent data items or events. In some embodiments, the most recent items may be determined by a timestamp associated with each data item. In some embodiments, the most recent items may be determined as the items that are most recently learned by the node (e.g., data items that were added to the data set or updated in the data set in a number of most recent gossip rounds). In some embodiments, each data item may be associated with a gossip round number and, after a certain number of rounds, further gossip on a data item will cease. How long a data item will be propagated by the gossip protocol may be determined by an expected number of rounds that is required for a data item to be fully propagated. For example, it may be determined that, under normal circumstances, the protocol will fully propagate a data item to all nodes in the system in 10 gossip rounds, by a probability of 99%. In such a system, any data item that was learned or originated more than 12 rounds ago may be left out of further gossip communications.

Figure 2A:
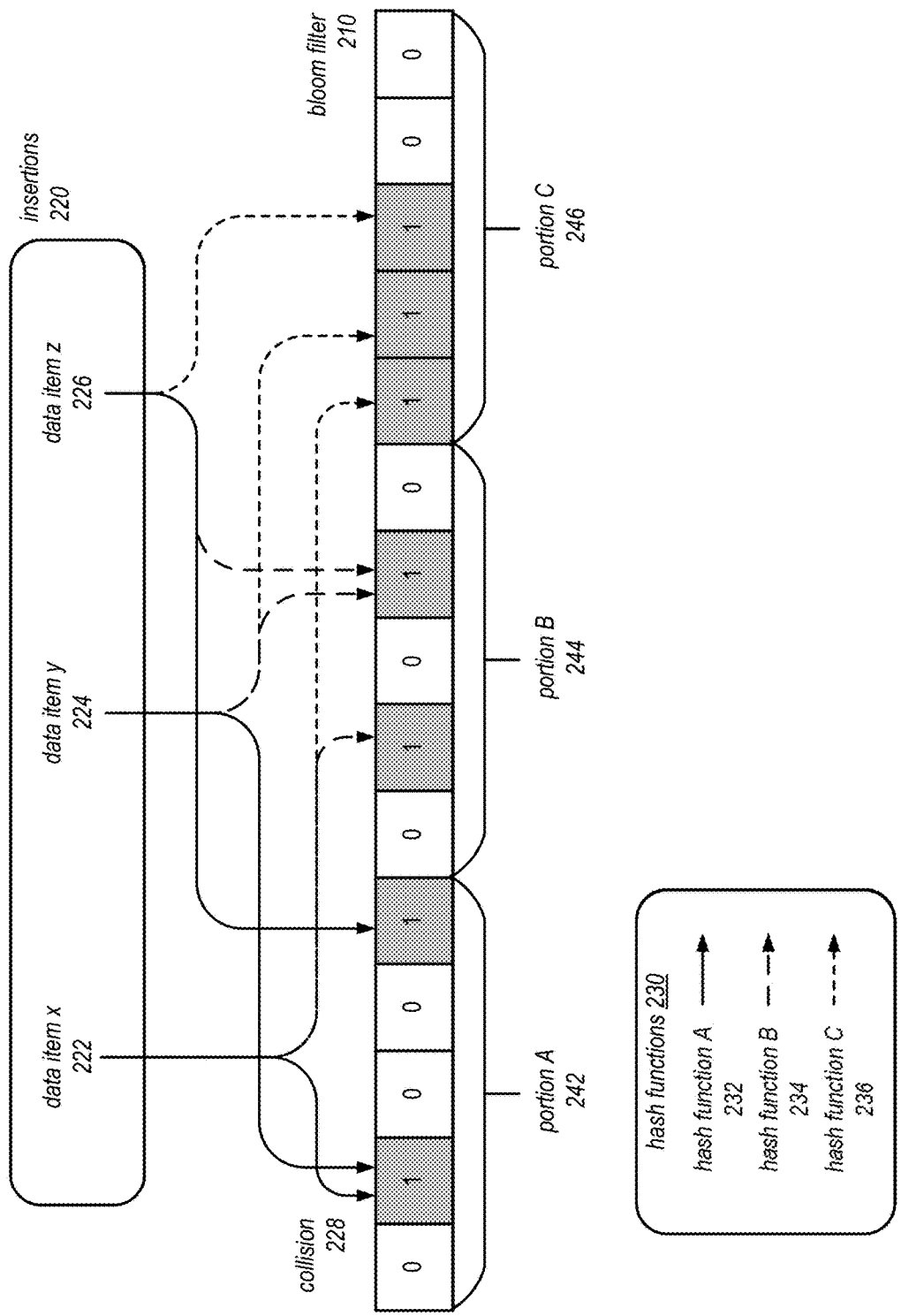
FIGS. 2A and 2B illustrate an exemplary probabilistic data structure used in an example gossip protocol that employs changing probabilistic data structure generation functions, according to some embodiments.
Figure 2B:
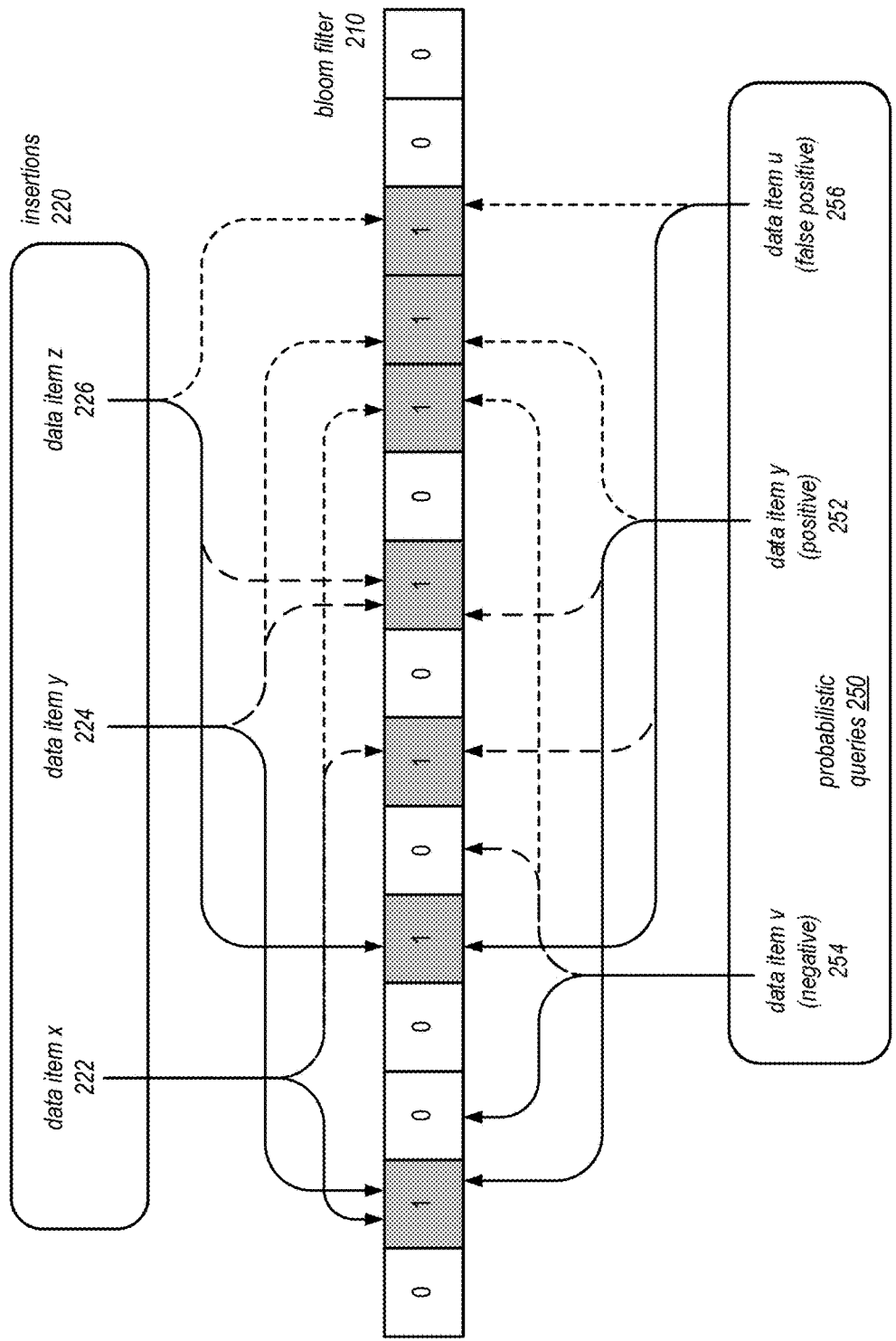

FIGS. 2A and 2B illustrate an exemplary probabilistic data structure used in an example gossip protocol that employs changing probabilistic data structure generation functions, according to some embodiments. As shown in FIG. 2A, the SEPDS structure that is used is a bloom filter 210. However, as explained, in other embodiments, other types of probabilistic data structures may be used.

The figure shows that the bloom filter 210 is encoded with three data items, x 222, y 224, and z 226, that are placed in the bloom filter via insertions 220. As shown, each item is hashed by a set 230 of three hash functions A 232, B 234, and C 236, to generate three different locations in the bloom filter 210. In different embodiments, a different number of hash functions may be used to implement the bloom filter. As shown, the bloom filter 210 may be a bit vector with a plurality of bit locations. To insert a data item into the bloom filter, all bit locations in the bloom filter 210 determined from the hashing of the data item using the hash functions are set to 1. Thus, as can be seen, when multiple data items are inserted into the same bloom filter 210, bit collisions such as collision 228 may occur. As these collisions increase, the rate of false positives from the bloom filter also increases.

In some embodiments, the bloom filter 210 may be divided into portions that correspond to the different hash functions, such that the result of each hash function only modifies its associated portion in the bloom filter 210. For example, in the illustrated example, hash function A 232 only modifies portion A 242, hash function B 234 only modifies portion 244, and hash function C 236 only modifies portion 246. The specific manner of partitioning may be different from embodiment to embodiment. For example, in some embodiments, each portion may not be a contiguous set of bits, as shown. In some embodiments, the sizes of different portions may be different. The partitioning of the SEPDS into portions in this manner increases the size of the SEPDS, but it allows for an easy generation of hash functions without increasing the error rate of the SEPDS.

A person of ordinary skill in the art would understand that bloom filters can be implemented with many different variations, and that the particular type of bloom filter illustrated here does not limit the broad inventive concepts of this disclosure. For example, in some embodiments, the bloom filter may record a count at each location. Such an implementation allows for deletion of items from the bloom filter. In addition, such a bloom filter provides a general indication of the degree of collision at each location in the bloom filter, which may be useful in selection hash functions. In some embodiments, the bloom filter may implement a chain of buckets for each bit location, each of which may be used to store a small signature of the data item. Thus, in some bloom filters, some amount of collisions may be tolerated in the bloom filter by allowing multiple data items to be chained at the same bit location.

FIG. 2B illustrates a number of lookup operations on the bloom filter 210. As shown, a set of probabilistic queries 250 may be performed at a later time on the bloom filter, for example, queries for data item v 254, y 252, and u 256. The probabilistic queries may be performed using the same set of hash functions 230 that were used to insert items into the bloom filter. As shown, a query for item v 254 results in a negative finding, because at least some of the three bits required for item v are set to 0 in the bloom filter. Thus, item v 254 is definitely not present in the bloom filter. The query for item y 252, not surprisingly, returns a positive finding, because all bits for item y are set to 1 in the bloom filter. Finally, the query for item u 256 also returns a positive. This query represents a false positive result, because item u was not actually inserted into the bloom filter. However, due to the way that items x, y, and z were hashed, it appears to the query 256 that item u is present in the bloom filter. This type of false positive is a possibility in many types of probabilistic data structures that use hashing to encode multiple data items into a probabilistic data structure.

The probability of false positives may be reduced to an extent by enlarging the bloom filter structure 210 or reducing the number of items that are place in the structure. However, this comes at a cost in terms of space usage efficiency. Thus, as discussed, in some embodiments, to reduce the probability of false positives over multiple rounds of use, the bloom filter 210 may be constructed using a different set 230 of hash functions each time, so that a false positive that occurs in one round is extremely unlikely to occur in the next round, or a number of successive rounds. Accordingly, if some new data item was not properly communicated by a node in a first round of the gossip protocol, it will probably be communicated in the next round, or successive rounds.

Figure 3:
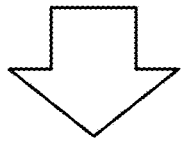
FIG. 3 illustrates an example process to generate hash functions used to generate a probabilistic data structure for a gossip protocol, according to some embodiments.
Figure 3:
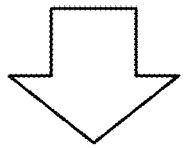

FIG. 3 illustrates an example process to generate hash functions used to generate a probabilistic data structure for a gossip protocol, according to some embodiments. As shown, the process may be based on two base hash functions 310 $\{H_1, H_2\}$. In some embodiments, the two hash functions $H_1$ and $H_2$ may be two independent, uniform random hash functions with a range of $\{0, 1, 2, \ldots p-1\}$. In some embodiments, p may be a prime number. In some embodiments, more than two base hash functions may be used. In some embodiments, the base hash functions may be generated using pseudorandom operations, by a master generator or master node in the distributed system. In some embodiments, the base hash functions may be propagated to the nodes of the distributed system to be used to generate the actual set of functions used to produce SEPDSs, such as functions A, B, and C of FIG. 2A. The base hash functions may regenerated and redistributed periodically, as needed.

As shown, in some embodiments, a hash function set 320 of k hash functions $\{g_0, g_1, g_2, \ldots g_i, \ldots g_{k-1}\}$ may be derived from the two base hash functions, where i ranges from 0 to k−1. For example, each of the k hash functions may constructed using the form:

$$g_i(x) = H_1(x) + i*H_2(x) \bmod p$$

Thus, each hash function $g_i(x)$ may have a range of $\{0 \ldots p-1\}$. In some embodiments, this set of hash functions may be used to construct the bloom filter or other SEPDS. For example, a bloom filter may include m=k*p bits, where each hash function in the set 320 is assigned to a disjoint subarray of p bits in the bloom filter. A new set of hash functions may be derived for each gossip round, for example, by varying the i values that are used. In some embodiments, the set of hash functions may be derived by simply combining the base hash functions using simple arithmetic operations, and without using costly randomizing operations. In some embodiments, the derivation of the set of hash functions may be performed by each of the nodes that participates in the gossip protocol. In other embodiments, the derivation may be performed by a master node, which then distributes a schedule of hash function sets to the other nodes.

It may be appreciated that in the example scheme of deriving the set of hash functions, for any given function $g_i$, and any two data items x and y, exactly one of the following occurs:

1. $g_i(x) \neq g_i(y)$ for all i; or
2. $g_i(x) = g_i(y)$ for exactly one i; or
3. $g_i(x) = g_i(y)$ for all i.

To understand this, assume that $g_i(x) = g_i(y)$ for at least two values of i. Then, it is clear that it must be true $H_1(x) = H_1(y)$, and thus $H_2(x) = H_2(y)$, which means all hash values are the same. In other words, if two data items collide for a single hash function in the set, they will not collide for other hash function in the set. Thus, if the hash functions are each assigned to its own portion in the SEPDS, any collision between two data items inserted to the SEPDS will only occur in one portion (as opposed to multiple portions). This property of the SEPDS makes false positives in the SEPDS very unlikely, because a false positive of an element requires a collision in each portion of the SEPDS, which must come from k different data items. In fact, it may be shown mathematically that in a bloom filter constructed this way using a set of k hash functions, where the bloom filter has m bits and contains n items, the probability of a false positive $\mathcal{F}$ for an element not in the bloom filter converges to:

$$Pr(\mathcal{F}) = (1 - e^{-kn/m})^k$$

as n and m grow large. This asymptotic false positive probability represents a result that is no worse than a standard bloom filter implemented using a set of purely random hash functions. However, hash functions constructed using the method described above requires less computation and requires no randomizing operations to create. Rather, as discussed, the set of hash functions may be derived from just two base hash functions using simple arithmetic operations.

Thus, in some embodiments, the set of hash functions may be independently generated at each gossip node using a common generation technique. For example, prior to a given gossip round, each of the gossip nodes may be provided the set of base hash functions $\{H_1, H_2\}$. During the gossip round, each gossip node may deterministically generate a set of k integers that are used to derive the set of k hash functions to be used for that round from the base hash functions. For example, the k integers may be determined based on a round identifier that is universally known by the gossip nodes. In some embodiments, the k integers may be generated from the current time value, which is the same for all gossiping nodes. In some embodiments, the set of k hash functions may not be explicitly stored; rather, the gossiping node may simply iterate over the k integers during the creation of the SEPDS, to hash each data item into each of the k portions of the SEPDS, using a different hash value determined from $H_1(x) + i*H_2(x)$ mod p.

As shown, in some embodiments, the process may include an optional step where the distributed system generates a schedule 330 of hash functions to use for each gossip round 335. For example, a master node may select different subsets of hash functions from the set of k hash functions to create the SEPDS in each round (e.g., round 147 uses $(g_4, g_2, g_{15},)$ as hash functions A 230, B 232, and C 234, and so on). The schedule 330 may be generated in a pseudorandom fashion, or in some embodiments, using a non-random rotation algorithm. The schedule may be generated by a master node in the distributed system and propagated to the other nodes of the system ahead of time. In some embodiments, the distribution of the schedule may be performed using the gossip protocol.

As may be understood, because each hash function in the generated set are relatively independent (e.g., any two given items only collides in one of the functions in the set), this independence property also holds for subsets of the set. Thus, any subset of the hash functions in the set may be appropriately used to generate SEPDSs with smaller number of partitions. In this way, the same base hash functions $\{H_1, H_2\}$ may be used for multiple rounds of the gossip protocol. In some embodiments, the base hash functions may be occasionally regenerated, but at a slower pace than the gossip rounds, for example, every 50 gossip rounds, while each of the gossip rounds uses a different subset of functions from the set that derives from the base hash functions.

FIGS. 4A to 4D illustrate different states in a distributed computing system that implements a gossip protocol that employs changing probabilistic data structure generation functions, according to some embodiments. The figures illustrate how information may be propagated in an example cluster 400 that includes cluster nodes 402, 404, 406, 410, 412, 414, 416, 418, and 420. As shown, legend 408 indicates that in the figures, a node that is colored indicates a node that has knowledge of a particular piece of new information of interest, and a uncolored node indicates that the node has no knowledge of that information. Further, a solid line indicates a gossip communication that successfully conveys the information from one node to another, while a dotted line indicates a gossip communication where absence of the information in the SEPDS is masked by other items in the SEPDS, i.e., a false positive.

Figure 4A:
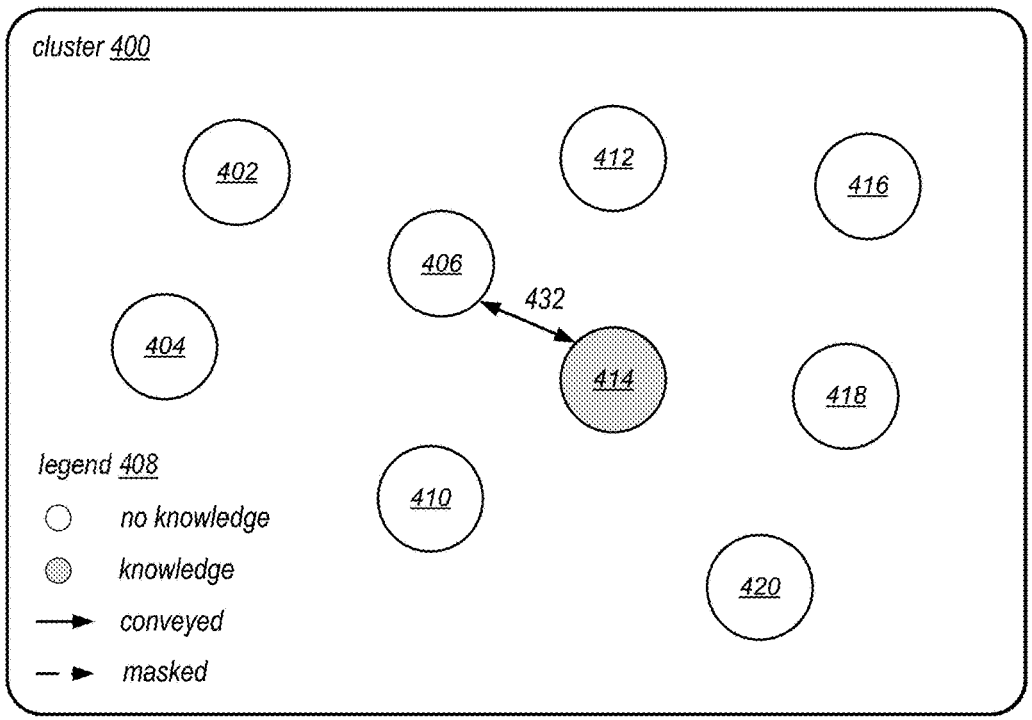
FIGS. 4A to 4D illustrate different states in a distributed computing system that implements a gossip protocol that employs changing probabilistic data structure generation functions, according to some embodiments.

In FIG. 4A, node 414 is the first node that is aware of the new information. For example, node 414 may become aware that it has undergone a status change. As a result, node 414 may gossip 432 with node 414 in the next gossip round to communicate this information to node 406. In some embodiments, node 405 may be selected in a pseudorandom manner by node 414. In some embodiments, each node may follow a round robin schedule to select gossip partners for each round. The gossip session 432 may comprise, for example, node 406 sending a SEPDS to node 414 indicating its knowledge of the nodes of the cluster, and node 406 returning a delta of information to node 406 based on one or more probabilistic queries performed on the SEPDS. As shown, the new information is successfully received by node 406, which updates its own data with the information accordingly.

Figure 4B:
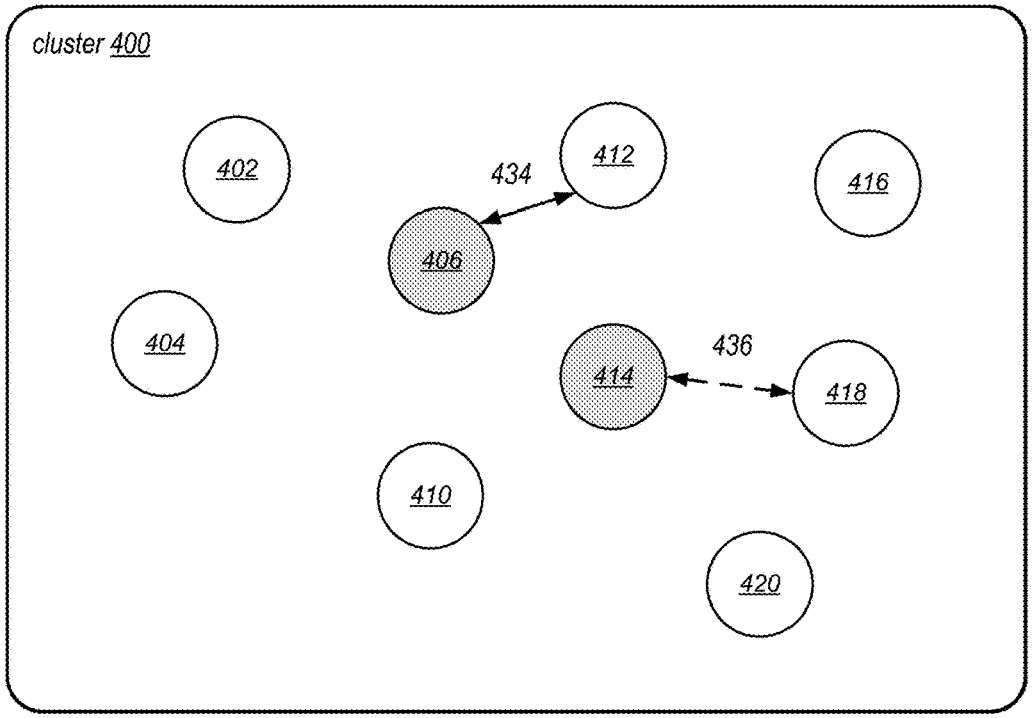

In FIG. 4B, node 406 is now colored, indicating that it is also aware of the new information. In the next gossip round, node 406 may gossip 434 with node 412, and node 414 may gossip 436 with node 418, to further propagate the new information. However, although node 406 successfully transfers this information to node 412, the gossip session 436 between nodes 414 and 418 fails to properly convey the new information to node 418. The failure may be caused by a SEPDS generated by node 418 that produced a false positive in response to the probabilistic queries of node 414. Due to the false positive, node 414 may have concluded that node 418 already has the new information. Based on this conclusion, node 414 may have refrained from sending the new information to node 418. The false positive thus causes a slowdown in the propagation of the new information in the cluster. However, the effects of the slowdown is limited by varying the hash functions used to generate the SEPDS from round to round. Thus, in the following round, node 418 may use a different set of hash functions to generate its SEPDS, which is unlike to cause the false positive that was seen in the gossip round of FIG. 4B.

In some embodiments, each node may implement its own set hash functions, and share its hash functions with the node that it is gossiping with. Thus, for example, the node initiating the gossip session may send its hash functions along with its SEPDS. In some embodiments, the hash functions may be represented as the base hash functions that can be used to derived the set. Thus, different pairs of gossiping nodes may implement different hash functions in their gossip. In some embodiments, a gossiping node may detect that the SEPDS that it generated may have a higher probability of false positives. For example, the node may add up the bits that are set in the bit vector to see if there have been many collisions, in view of the number of input data items. In some embodiments, the node may construct a bloom filter that maintains a count at each location of the bloom filter. A location with a high count indicates a high number of collisions.

When the node detects a high false positive condition, the node may modify its set of hash functions to generate a new SEPDS, or alternatively, generate additional SEPDSs to be sent to possibly other nodes in the same gossip round. In particular, if the node detects that a particular bloom filter location has a high collision count, it may swap out the hash function associated with that portion of the bloom filter and replace it with another one. In some embodiments, the node may split the data items that it wishes to gossip about into multiple sets, and create multiple SEPDSs from the multiple sets. Accordingly, if a particular node learns of a large amount of information in one particular round, it may generate more (and more varied) SEPDSs in the next round, to distribute the information more quickly.

Figure 4C:
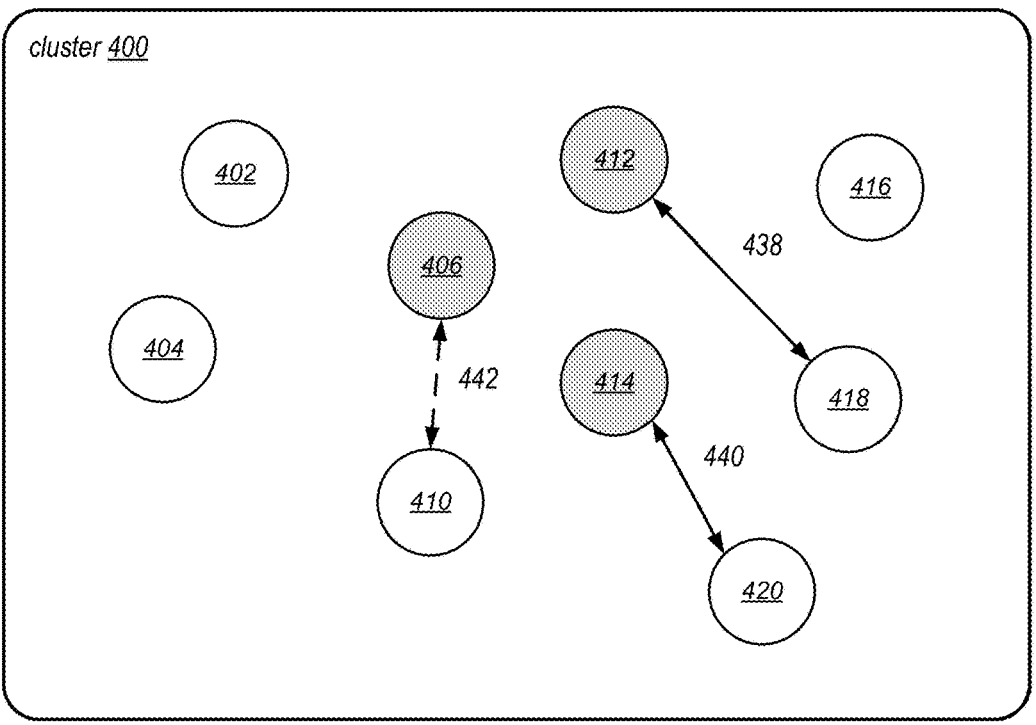

FIG. 4C depicts a next round of the gossip protocol. In this round, nodes 406, 412, and 414 have now received the new information, and they gossip with nodes 410, 418, and 420, respectively. In this round, gossip sessions 438 and 440 successfully conveys the new information to new nodes, while gossip session 442 does not convey the new information to node 410. Again, because of the inherent possibility of false positives with the use of SEPDSs, each given gossip communication may miss some information. Nonetheless, the information is still propagated in an exponential fashion on the whole.

Figure 4D:
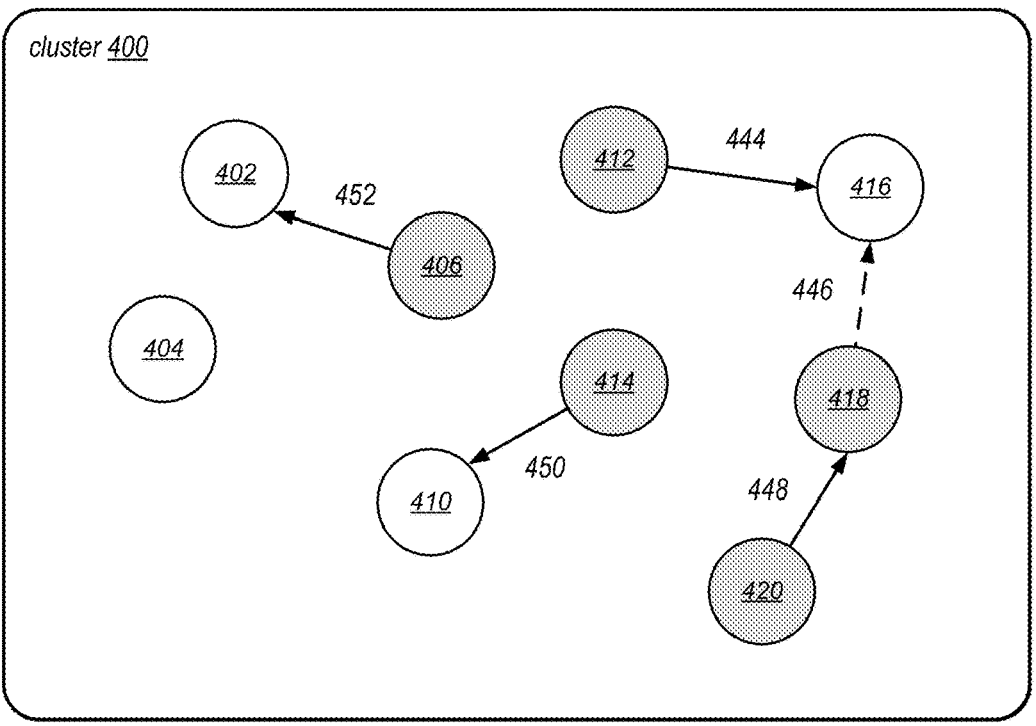

Thus, in FIG. 4D, five different nodes in the system have learned of the new information, and they will further propagate the information to other nodes. In some embodiments, two nodes may gossip with the same node, as shown with nodes 412 and 418. In such a scenario, node 416 may change SEPDSs with both nodes 412 and 418, which may all be constructed using the same set of hash functions designated for that round. Again, some small percentage of the gossip communications my miss some information, such as gossip communication 446. However, on the whole, the information continues to spread throughout the cluster. In some embodiments, the hash function generation algorithm may be designed to ensure that, under normal circumstances, the gossip protocol will propagate a new data item to all nodes in the distributed system in a specified number of rounds, by a certain probability.

Figure 5A:
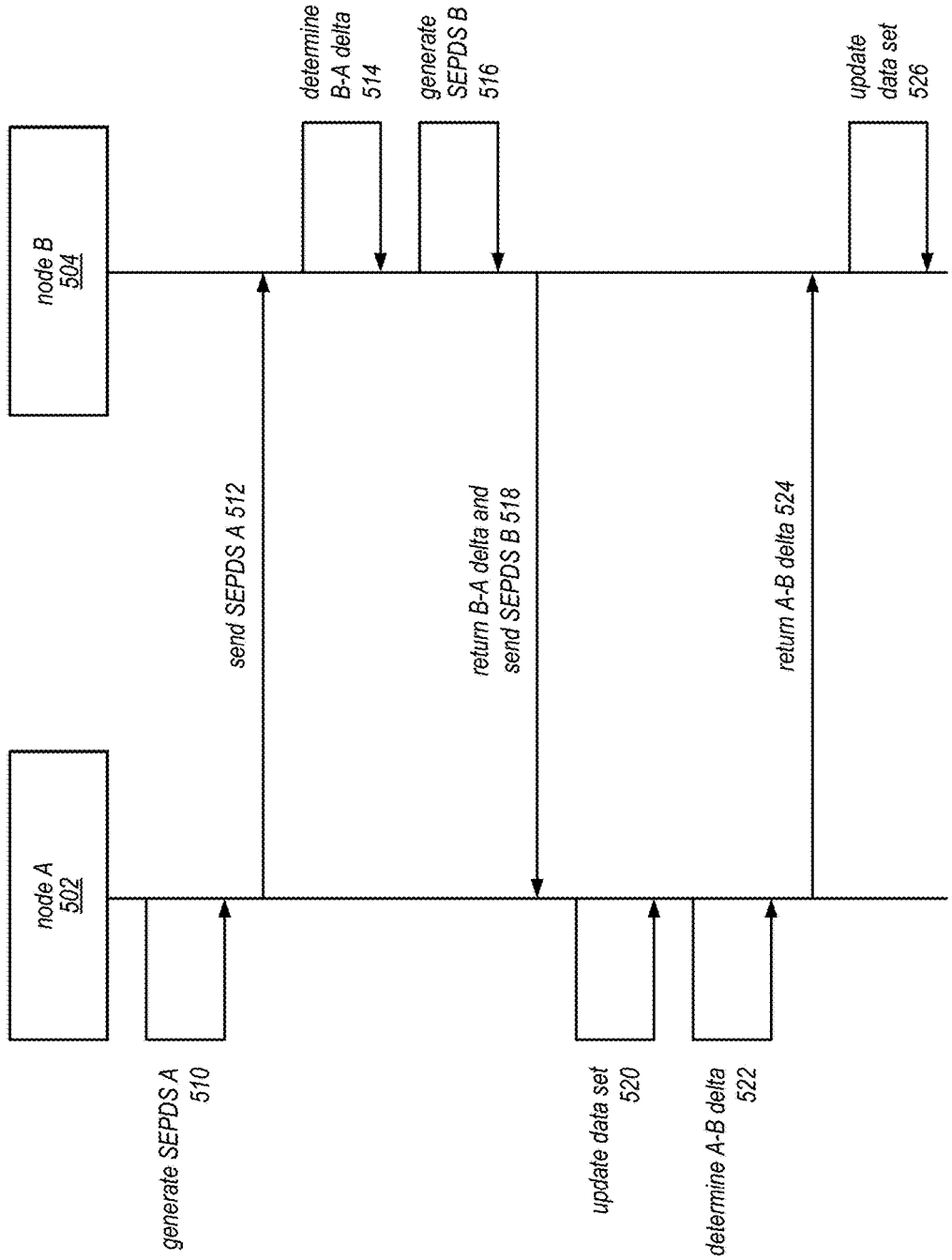
FIG. 5A illustrates a bilateral gossip interaction between two nodes in a distributed computing system that implements a gossip protocol that employs changing probabilistic data structure generation functions, according to some embodiments.

FIG. 5A illustrates a bilateral gossip interaction between two nodes in a distributed computing system that implements a gossip protocol that employs changing probabilistic data structure generation functions, according to some embodiments.

As shown, FIG. 5A depicts two nodes, node A 502 and node B 504. During a particular gossip round, node A 502 may generate a SEPDS A 510 from its data set. As discussed, the SEPDS may be generated using a set of hash functions that is particular to the round. In some embodiments, the generation is performed by node A itself, by combining two or more base hash functions and without using costly randomization operations.

At operation 512, the SEPDS A is sent to node B. For example, in some embodiments, node A may select node B via some node selection technique, which may be in part a randomized technique, and initiate gossip with the selected node. The initiating message may include the SEPDS A.

At operation 514, node B may determine a B-to-A delta between the contents of its own data set and the apparent contents of the SEPDS A. The comparison may determine a set of items that are present in node B's data set but missing from the SEPDS A. The comparison may be accomplished by performing a series of probabilistic queries of the SEPDS, where each item in node B's data set is hashed using the same set of hash functions used by node A to create the SEPDS, and checking to see whether the results from the hash functions are reflected in the SEPDS. As discussed, SEPDSs such as bloom filter may produce false positives in response to these probabilistic queries.

At operation 516, node B may generate its own SEPDS B 516 to be sent back to node A. Thus, nodes A and B will engage in a symmetrical process where each node will receive a delta from the other node, and attempt to synchronize its own data set with the delta from the other node. In some embodiments, SEPDS B may be generated using the same hash functions as used by node A.

In some embodiments, operation 516 may be performed before operation 514. In some embodiments, before any probabilistic queries are performed on SEPDS A, node B may do a simple bit compare of its own SEPDS B with the received SEPDS A. If the two are the same, then operation 514 may be skipped, because the data sets of the two nodes are apparently the same. In this case, node B may still send a nonce value back to node A to indicate that no additional items are known to node B other than the items in SEPDS A.

At operation 518, the B-to-A delta determined by node B (if any) is sent back to node A, along with node B's SEPDS B. In some embodiments, node B may send its SEPDS B regardless of the comparison, because it may have additional data items that are not possessed by node A. The network message for operation 518 may be kept as small as possible, so as to not generate excessive network traffic. For example, in some embodiments, the B-to-A delta may be compressed using a data compression technique before it is sent.

At operation 520, if any delta is received from node B, node A interprets the delta and applies the delta to its own data set. Thus, as a result of this update, node A will have all items that are known to node B, except those items that were missed as a result of false positives caused by the SEPDS. However, any missed information is likely to be received again in future gossip rounds, from other nodes.

At operation 522, node A may determine an A-to-B delta using a similar technique as used by node B. At operation 524, the A-to-B delta is send back to node B. At operation 526, node B applies the delta to update its data set, similar to the update performed by node A. Thus, at the end of the gossip exchange, both nodes will have approximately the same items in their data sets, except for any items that were missed due to false positives.

Figure 5B:
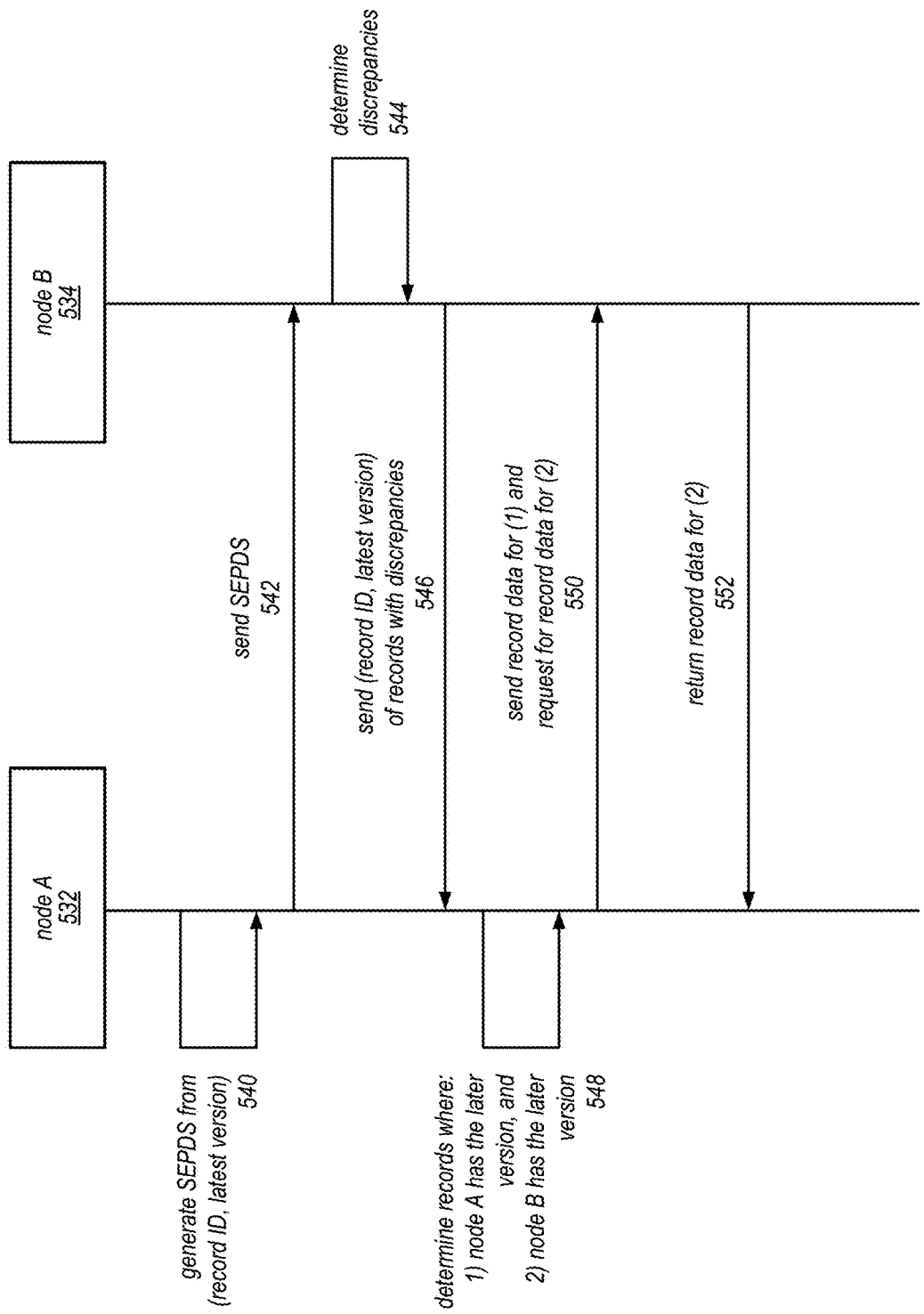
FIG. 5B illustrates another example bilateral gossip interaction between two nodes in a distributed computing system that implements a gossip protocol that employs changing probabilistic data structure generation functions, according to some embodiments.

FIG. 5B illustrates another bilateral gossip interaction between two nodes in a distributed computing system that implements a gossip protocol that employs changing probabilistic data structure generation functions, according to some embodiments.

In the embodiment illustrated in FIG. 5B, node A 532 may gossip with node B 534. In this embodiment, each record stored in the nodes' data sets may be associated with a version that increments over time, so that a record having a more advanced version represents better information than an older version, and supersedes older version. For example, in some embodiments, node metadata in a cluster may be versioned. As the node's state changes over time, its version number may increment (e.g., version 2, version 3, and so on). In such a system, a later version of a node's metadata represents better information than an earlier version. Thus, the embodiment illustrated in FIG. 5B first determines a list of records (e.g., node metadata records) where the two gossiping nodes disagree about the latest version. The two nodes then exchange the version information for the records on the list to determine which of the two nodes has the better information for each record, and then exchange the record data accordingly. In this manner, the use of the network to transmit actual record data (which may be large) is kept to a minimum.

As shown, at operation 540, node A may generate a SEPDS using by inserting data items that include both a record ID and a latest version ID for a record in node A's data set. Thus, the generated SEPDS reflects node A's view of the latest versions of its records. At operation 542, the SEPDS is sent to node B.

At operation 544, node B uses the SEPDS to determine any discrepancies between its view of the latest versions of records and node A's view. From node B's perspective, any record ID/version ID combination that is cannot be found in the SEPDS represents a discrepancy. A missing data item may be due to the fact that node A does not have the record, or has a different version as the latest version of the record. Node B may make its determination by performing probabilistic queries on the SEPDS using the record IDs and respective latest versions in its own data set. In some embodiments, such queries may return a small set of records where there is a detected discrepancy. These discrepancies are added to a list, which is sent back to node A. In some embodiments, some records may be missed due to false positives. However, as discussed, the effects of such false positives are reduced via the use of changing hash functions.

At operation 546, node B may send the record IDs and latest versions of records that were determined to have discrepancies in a list, back to node A. For example, node B may determine that the two nodes have discrepancies regarding records X, Y, and Z. Node B may then send the record IDs of these records, along with their respective latest version numbers, to node A.

At operation 548, node A examines the list of disagreed upon records from node B, and determines two things. First, node A determines records from the list where node A has the better version. Second, node A determines records from the list where node B has the better version (or in some cases, where node B has a record that is unknown to node A). Node A may perform this operation by comparing the record IDs and version IDs in the discrepancy list from node B with corresponding record IDs and version IDs in its own data set. In some cases, node A may have better versions for all records in the discrepancy list. In some cases, node B may have better versions of all records in the discrepancy list.

At operation 550, depending on the outcome of operation 548, node A may send two things to node B. First, node A may send record data for any records where node A has the better version. Second, node A may send a request to node B to retrieve the record data for any records where node B has the better version. In some cases, only one of these two things may be send to node B, depending on the outcome of operation 548. At operation 552, in response to the request from node A, node B may provide the record data for all records where node B has the better version.

Thus, as may be understood, node A makes a determination as to which of the two nodes have the better version of each disagreed upon record at operation 548, and the two nodes exchange record data based on that determination. This process thus minimizes the amount of network traffic generated during the gossip interaction. As may be appreciated by those skilled in the art, this technique may be repeated in the reverse direction, so shown in FIG. 5A, so that both nodes can check the state of the data set of the other node. The technique described in connection with FIG. 5B may be employed in a variety of applications where different versions of information may exist across nodes of a distributed system. For example, in some embodiments, instead of a version, a record may be associated with an epoch ID or a timestamp, so that a later epoch or timestamp is considered better information. In some embodiments, instead of a version, a record may be associated with a confidence or quality parameter that indicates the quality of the record. Such a metric may be used to determine which node has the better copy of the record during the gossip interaction.

Figure 6:
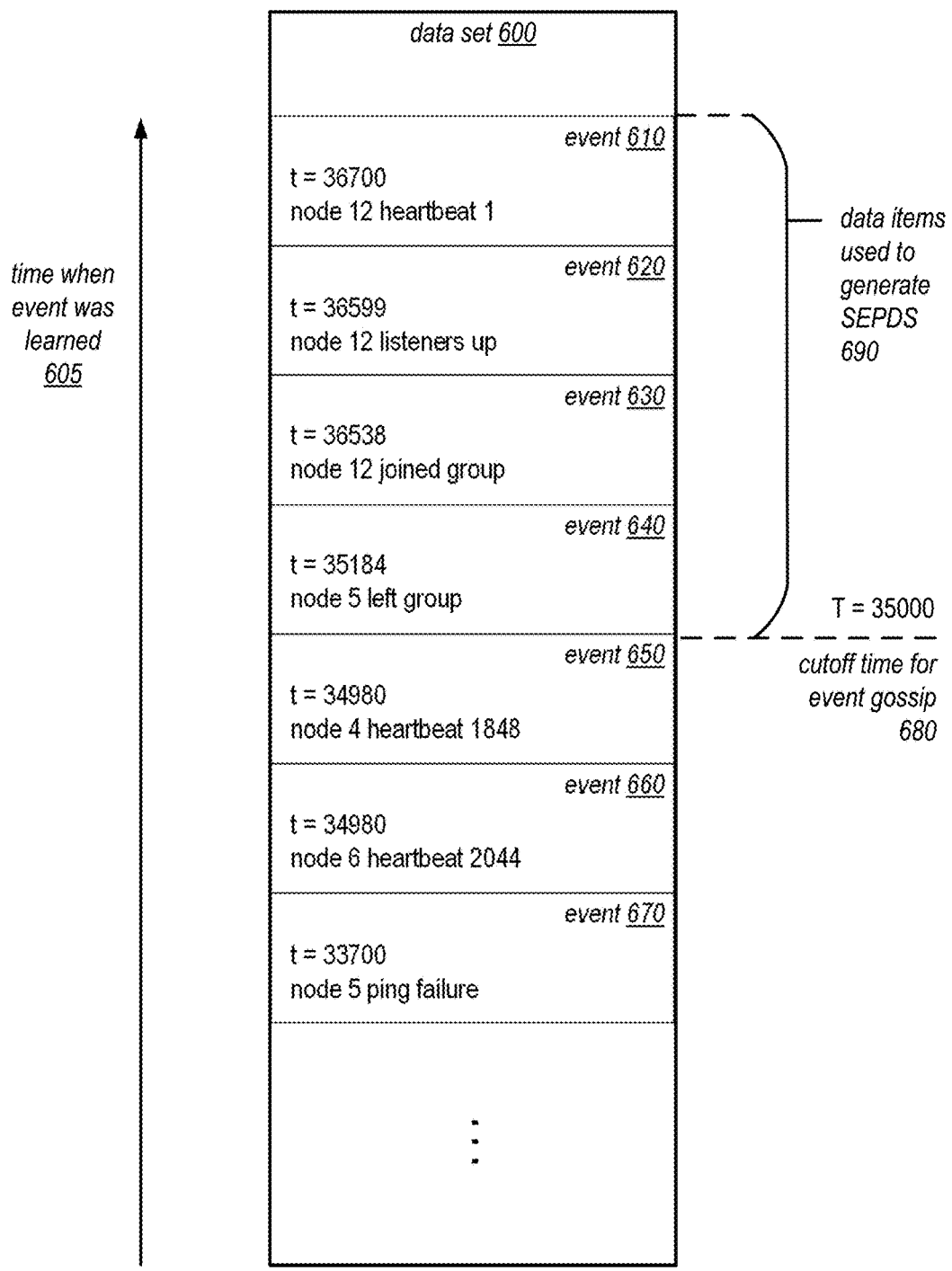
FIG. 6 illustrates an example data set that may be synchronized among nodes of a distributed computing system that implements a gossip protocol that employs changing probabilistic data structure generation functions, according to some embodiments.

FIG. 6 illustrates an example data set that may be synchronized among nodes of a distributed computing system that implements a gossip protocol that employs changing probabilistic data structure generation functions, according to some embodiments.

As shown, the data set 600 in this example may store data item that comprise events, such as events 610, 620, 630, 640, 650, 660, and 670. Some version of data set 600 may be stored locally on each node of a distributed system, and synchronized among the nodes using an implementation of the gossip protocol, as discussed in connection with previous figures. In some embodiments, the events may be stored in a chronological order 605 of a time value associated with each event, for example, the time when the node first learned of an event. In other embodiments, the events may be associated with other time values. For example, the time value may be a timestamp generated when the event occurred, or in some embodiments, a time when the event was first learned by the node. In some embodiments, events may be tagged with a round identifier that indicates the gossip round when an item was first learned, first added, or last modified. In some embodiments, the events may not be associated with a time indicator, but simply stored in a chronological order.

As shown, the events in this example may be associated with node events, such as nodes joining or leaving a node group (e.g., events 630, 640), detected heartbeats from the nodes (e.g., events 610, 650, 660), certain failure conditions (e.g., event 670), and certain other status events (e.g., event 620). The events in this example are tagged with a timestamp (labeled with the variable t) and sorted according to the timestamp in reverse chronological order. Thus, the topmost events in the data set 600 are the most recently learned events.

In some embodiments, in order to limit the amount of information that nodes are responsible for synchronizing (and therefore limit the amount of network traffic generated by the gossip protocol), the nodes may be configured to only examine a subset of data items in the data set, as specified according to a policy or criteria. In the illustrated example, only a subset of the most recently learned events 690 are used generate the SEPDS for the gossip protocol. Conversely, a receiving node in a gossip communication may check the SEPDS against only data items in its data set that satisfy the same criteria. The criteria may be a configurable rule that is specified in a policy for the gossip protocol. In some embodiments, a configuration policy may specify a cutoff time for events to gossip about, such as cutoff time 680 in the figure. In some embodiments, the subset of data items may be determined by a hard number of data items, for example, the most recent 5 items. In some embodiments, the subset may be determined in a pseudorandom fashion, from round to round.

In some embodiments, in the context synchronizing event logs, the gossip protocol may be limited to a number of most recently received events, where the number is determined based on an expected propagation rate of the protocol. Thus, in an example where the gossip protocol is expected to propagate an item to all nodes within 10 of gossip rounds under average conditions, the gossip protocol may set a gossip window to limit gossip to only items received within the last 10 rounds. Accordingly, the universe of information that is being distributed by the protocol does not continue to grow endlessly, and use of the system's network may be more easily controlled.

Figure 7A:
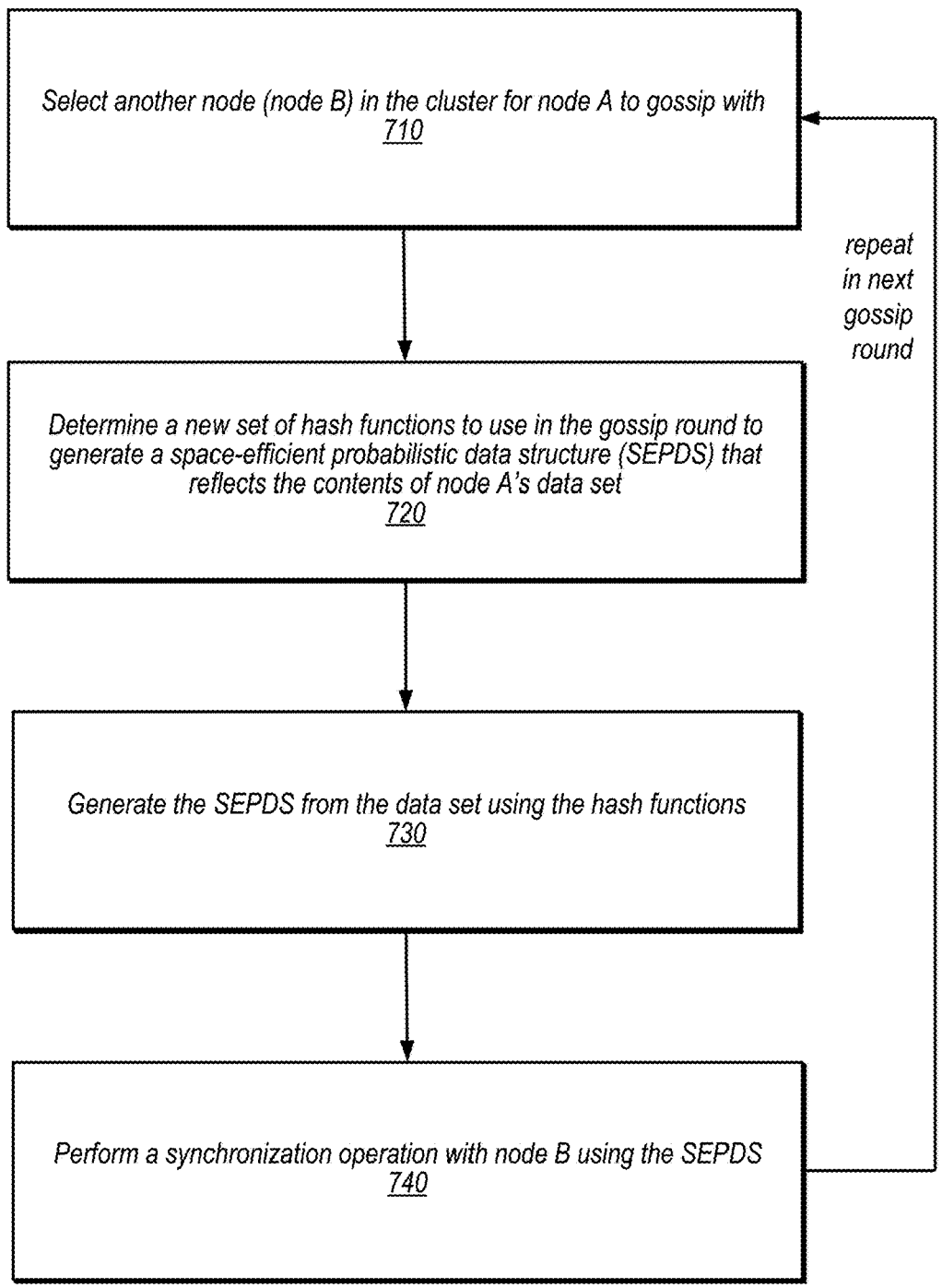
FIGS. 7A and 7B are flowcharts illustrating the operations of two nodes in a gossip communication in a distributed computing system that implements a gossip protocol that employs changing probabilistic data structure generation functions, according to some embodiments.
Figure 7B:
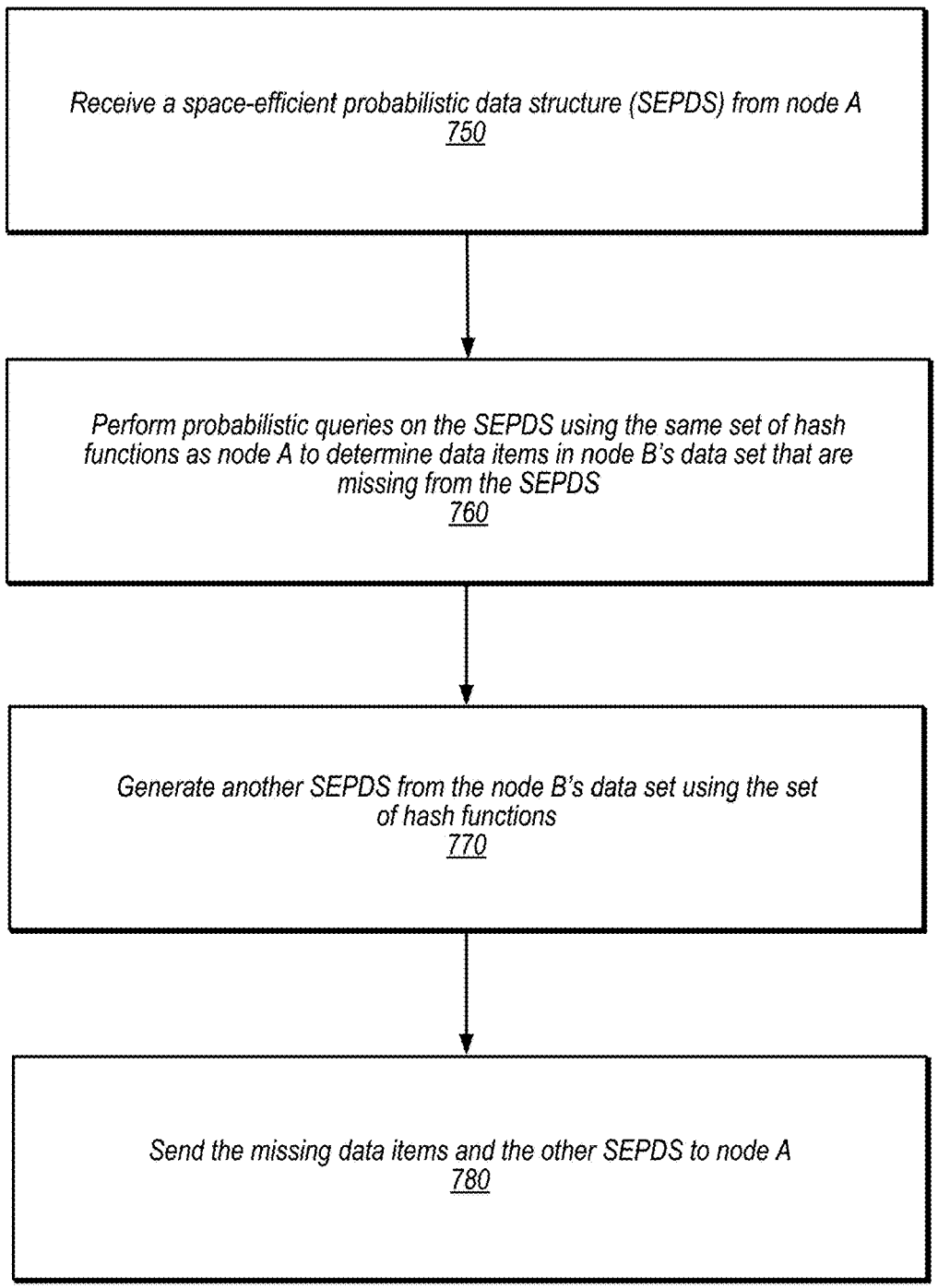

FIGS. 7A and 7B are flowcharts illustrating the operations of two nodes in a gossip communication in a distributed computing system that implements a gossip protocol that employs changing probabilistic data structure generation functions, according to some embodiments. FIG. 7A depicts an example process that is used by a node (node A) that sends a SEPDS. The process may be carried out by, for example node 120, as discussed in connection with FIG. 1.

At operation 710, node A selects another node (node B) in the cluster to gossip with. For example, in some embodiments, nodes may select different gossiping partners for each round. The selection may be performed, in some embodiments, as least partly in a pseudorandom fashion. In some embodiments, the selection may be dictated by a deterministic schedule, for example, a round robin schedule that ensures every pair of nodes in the system engages in a gossip at some round.

At operation 720, node A determines a new set of hash functions to be used in a round of a gossip protocol. The set of hash functions may be used to generate a space-efficient probabilistic data structure (SEPDS) from the node's data set, and changes from round to round. In some embodiments, the SEPDS comprises a bloom filter. In some embodiments, the hash functions may be used to insert data items in the data set into the bloom filter. In some embodiments, the hash functions may be assigned to different portions of the SEPDS such that the result of each hash function only modifies the associated portion of the SEPDS. In some embodiments, the hash functions may be derived from two or more base hash functions, where the derivation of the hash functions do not rely on randomizing operations. In some embodiments, the set of hash functions may not be generated explicitly, but implicitly used during the insertion of a data item based on the resulting hash values of the base hash functions. Thus, by changing the manner in which the SEPDS is created from round to round, the protocol ensures that no false positive error will persist from round to round.

At operation 730, the SEPDS is generated from the data set of node A using the set of hash functions. The generated SEPDS may reflect the contents of the data set, for example, the membership of items in the data set. In some embodiments, the SEPDS may be generate from only a subset of items in the data set, for example a set of the most recently learned items. As discussed, hash functions may be employed in various ways to create SEPDSs, such as bloom filters, Cuckoo filters, data signatures, and the like. In the case of bloom filters, each data item is hashed using all hash functions in the set, which results in individual locations in the bloom filter. These individual locations are then modified to reflect the data item. In some embodiments, the bloom filter may be a bit vector, and modifying the bloom filter at a particular location may amount to setting a bit at a particular bit location. As discussed, in some embodiments, the hash functions are each assigned to a portion of the bloom filter, so that they do not generate collisions with each other in the bloom filter.

At operation 740, node A performs a synchronization operation with node B using the SEPDS. For example, in some embodiments, node A may send the SEPDS to node B. The SEPDS may be sent, for example, via the network interface of node A, and over a network such as a local area network. However, a person of ordinary skill in the art would appreciate that any type of data network may be used. By reducing the data set down to a SEPDS, less data is sent over the network during gossip communications. This reduces the network load on the system and allows for faster convergence among the nodes.

The node B may, in turn, check the SEPDS against its own data set to determine any data items that it has but that are not present in the SEPDS. This process is discussed in further detail in FIG. 7B. Node A may then use the set of additional data items from node B to update its own data set. Thus, at the end of the update, the node A's data set will include approximately all data items in node B's data set, excluding any items that were not masked due to false positives in the SEPDS. In some embodiments, the node B may also piggyback a second SEPDS built from its own data set onto the missing data items, so that the process repeats in the opposite direction, with the roles of the two nodes switched. That is, node A will use probabilistic queries to generate a set of data items that appear to be missing in the second SEPDS, and send those missing items back to the node B, which in turn updates its own data set. In this manner, the two nodes may engage in a synchronization step that results in the complete synchronization of the two data sets, excepting any information that is lost due to false positives.

As shown, once operation 740 completes, this may represent the end of a gossip round. The process than repeats in the next gossip round, as shown by the arrow. As the gossip protocol continues from round to round, the gossiping partners may change, and also the hash functions used to generate the SEPDS may also change, such that any false positives that occurred in the previous rounds are not likely to occur in subsequent rounds. Thus, even if some data item in node B's data set was not conveyed to node A because of a false positive in node A's SEPDS, this problem will not likely occur in the next round, and node A will receive that data item eventually. Thus, the gossip protocol ensures that all information is eventually propagated to all nodes in the distributed system.

FIG. 7B depicts an example process that is used by a node (node B) that receives a SEPDS in a gossip communication. The process may be carried out by, for example node 122, as discussed in connection with FIG. 1. In this process, node B may be the counterpart to node A in FIG. 7A.

At operation 750, node B receives a SEPDS from node A. This SEPDS may be, for example, the SEPDS that was generated in operation 720 in FIG. 7A. As discussed, the SEPDS may be sent to node B via the network that connects the two nodes. Any type of data network may be used for this purpose. One of the benefits of using the SEPDS, which is a relatively small data structure, is that network load on the system is reduced.

At operation 760, node B performs one or more probabilistic queries on the SEPDS using the hash function to determine data items in the node B's data set that are missing from the SEPDS. Thus, node B may first determine the set of the hash functions to probe the SEPDS. In some embodiments, node B may determine the hash functions using a common hash function generation technique as node A. For example, in some embodiments, base hash functions that are used to derive the set of hash functions may be provided to both nodes ahead of time, so that both nodes can carry out a fast generation process to produce the same set of hash functions. In some embodiments, either the base hash functions or the working set of hash functions may be provided to the nodes of the system by a master source, such as a master node that is elected to perform such functions. In some embodiments, the master source may generate a schedule of hash functions to use from round to round, and provide the schedule to the nodes of the system. Such data may be distributed to the system's nodes via the gossip protocol itself.

The querying of the SEPDS may be different from embodiment to embodiment depending on the type of SEPDS. In the case of bloom filters, for example, node B may generate a fingerprint (or hash value) of each data item in its data set using the set of hash functions, and check whether the bloom filter contains that fingerprint. As may be understood, such a process will be able to confirm that some data item is definitely not in the SEPDS (and thus node A's data set), but may produce false positives where an item not actually in node A's data set appears to be in the SEPDS. However, the effects of such errors are reduced by varying the hash functions used to generated the SEPDS, from round to round.

At operation 770, node B generates its own SEPDS from node B's data set using the set of hash functions. Thus, node B performs the same operation as node A in operation 730 in FIG. 7A. The generation of this second SEPDS allows node B to query node A for any additional data items that node A may have. Thus, the two nodes may engage in a symmetrical process where the additional data items seen by each node are shared with the other node. In some embodiments, node B may perform a shortcut where operation 770 is performed first, before operation 760. Specifically, after the second SEPDS is generated, node B may perform a bit compare of the second SEPDS with the receive SEPDS from node A. If the two are identical, node B may in some embodiments assume that there is no reason to perform the probabilistic queries in operation 760. Node B may further determine in some embodiments that there is no need to perform operation 780, where missing data items from node A's SEPDS are determined and sent to node A. Instead, operations 760 and 780 may both be skipped, since the two SEPDSs are identical. In that case, which may be a common occurrence in systems where new information are relatively infrequent, node B may simply respond with a short message to node A that the two SEPDSs are identical, and the gossip communication between the two nodes complete.

At operation 780, any missing data items that were missing from node A's SEPDS and the other SEPDS generated by node B are sent to node A. Thus, via this exchange, node A will receive any extra information in the data set from node B, except any information that was masked due to false positives. In addition, node A may perform the similar operations 750, 760, and 780 as node B, to send back any data items that are not found in node B's SEPDS, thus completing the bilateral exchange of information. In some embodiments, the missing data items sent to node A may be kept to a small size so as not to generate excessive network traffic. For example, in some cases, the data items may be compressed before they are sent. In some embodiments, the data items may be sent at random times during the gossip round, so as not to generate a spike in network traffic from all nodes sending such data in unison. In some embodiments, the gossip protocol may limit the data that is exchanged during gossip by limiting the gossip to only a subset of the data set, for example, the most recent items in the data set. In some embodiments, for example, only events that were generated after a last time cutoff or new data items that were learned within the last number of rounds will be exchanged. In some embodiments, the data items may be tagged with version or epoch numbers, and when a difference in the two nodes' data sets are determined, a version delta is determined, which is limited to the difference between a latest version of data found in the SEPDS and the latest version known to node B. Thus, only the version delta of the data set is sent, further limiting the size of the data sent in operation 780.

Figure 8:
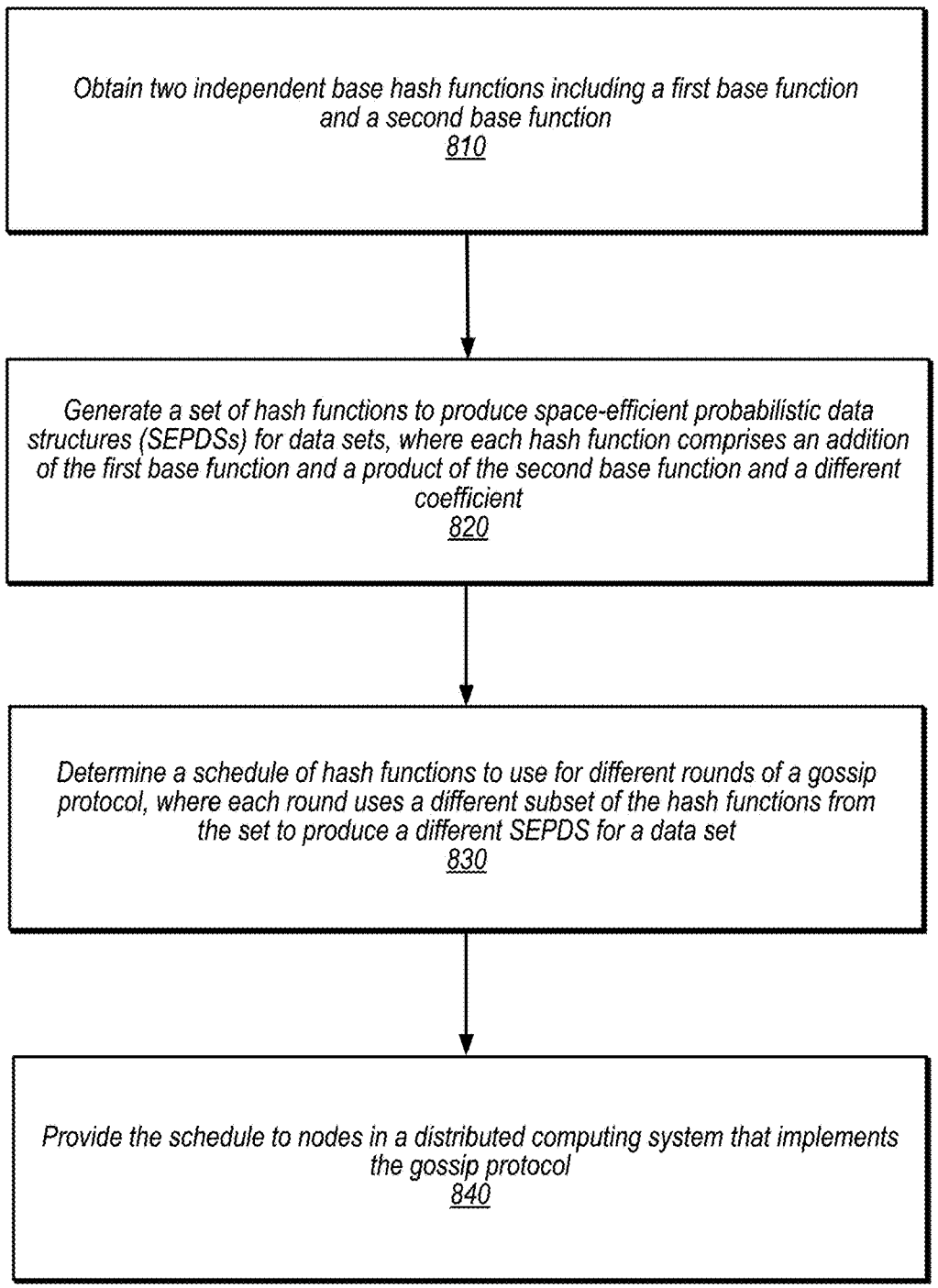
FIG. 8 is a flowchart illustrating a process of generating hash functions used to create probabilistic data structures used in a gossip protocol, according to some embodiments.

FIG. 8 is a flowchart illustrating a process of generating hash functions used to create probabilistic data structures used in a gossip protocol, according to some embodiments. The process of FIG. 8 may be performed by a master node in the distributed system that is tasked with the generation of these functions. However, in some embodiments, some operations of the process may be performed locally on the gossiping nodes themselves. For example, in some embodiments, the gossiping nodes may receive some data (e.g. a number of base hash functions) that are used to generate working hash functions for each round, so that the gossiping nodes themselves can determine the set of working hash functions.

At operation 810, two independent base hash functions are obtained, including a first base function and a second base function. In some embodiments, the base functions may be provided to the system by a configuration provided by an administrator. In some embodiments, the system may continually generate the base hash functions according to a schedule and/or a random generation algorithm. However, in some embodiments, costly randomizing operations may only be used to generate the base hash functions, such that the actual hash functions used to generate the SEPDS are derived without any such costly operations. In some embodiments, the number of base hash functions may be more than two. In some embodiments, the base hash functions may have the same range.

At operation 820, a set of hash functions is generated, to be used to produce space-efficient probabilistic data structures (SEPDSs) for data set. Each hash function may be constructed so that it comprises an addition of the first base function and a product of the second base function and a different coefficient. Thus, in some embodiments, each hash function may take the form $g_i(x)=H_1(x)+i*H_2(x) \mod p$, where $H_1$ and $H_2$ are the two base hash functions, i is the coefficient that is different for each hash function in the set, and is p the size of the range of bits in the SEPDS that the hash function is assigned to modify. As discussed, in some embodiments, each hash function may be assigned a portion in the SEPDS so that the result of the hash function only modifies that portion. As can be seen, the construction of hash functions g may be performed using simple arithmetic operations, and without any costly randomizing operations. Thus, the generation of these hash functions may be performed more quickly, and in some embodiments, may be performed by the gossiping nodes themselves.

At operation 830, a schedule of hash functions to use for different rounds of the gossip protocol is determined. In some embodiments, each round may use a different subset of the hash functions from the set to produce a different SEPDS for a data set. This optional operation may be performed may a master node, which may be configured to generate such schedules for the gossiping nodes. However, in some embodiments, the entire set of hash functions generated in operation 820 may simply be passed to the gossiping nodes to be used for one or more gossip rounds. In some embodiments, the schedule may be determined in a pseudorandom manner. In some embodiments, the schedule may be constructed from a rotation algorithm that uniformly uses the hash functions in the set.

At operation 840, the schedule is distributed to the nodes of the computing system that implements the gossip protocol. In some embodiments, the set of hash functions may also be provided to the nodes of the computing system. In some embodiments, the schedule and the hash functions may be provided in two separate network transmissions. In some embodiments, the set of hash functions is provided by simply providing the base hash functions, and thus the generation of the working set of hash functions is built by the gossiping nodes themselves. In some embodiments, the gossiping nodes may not explicitly construct the set of hash functions, but use the base hash functions and the different coefficients to generate the SEPDS. In some embodiments, the schedule and/or the set of hash functions may be provided to the nodes via the gossip protocol.

Figure 9:
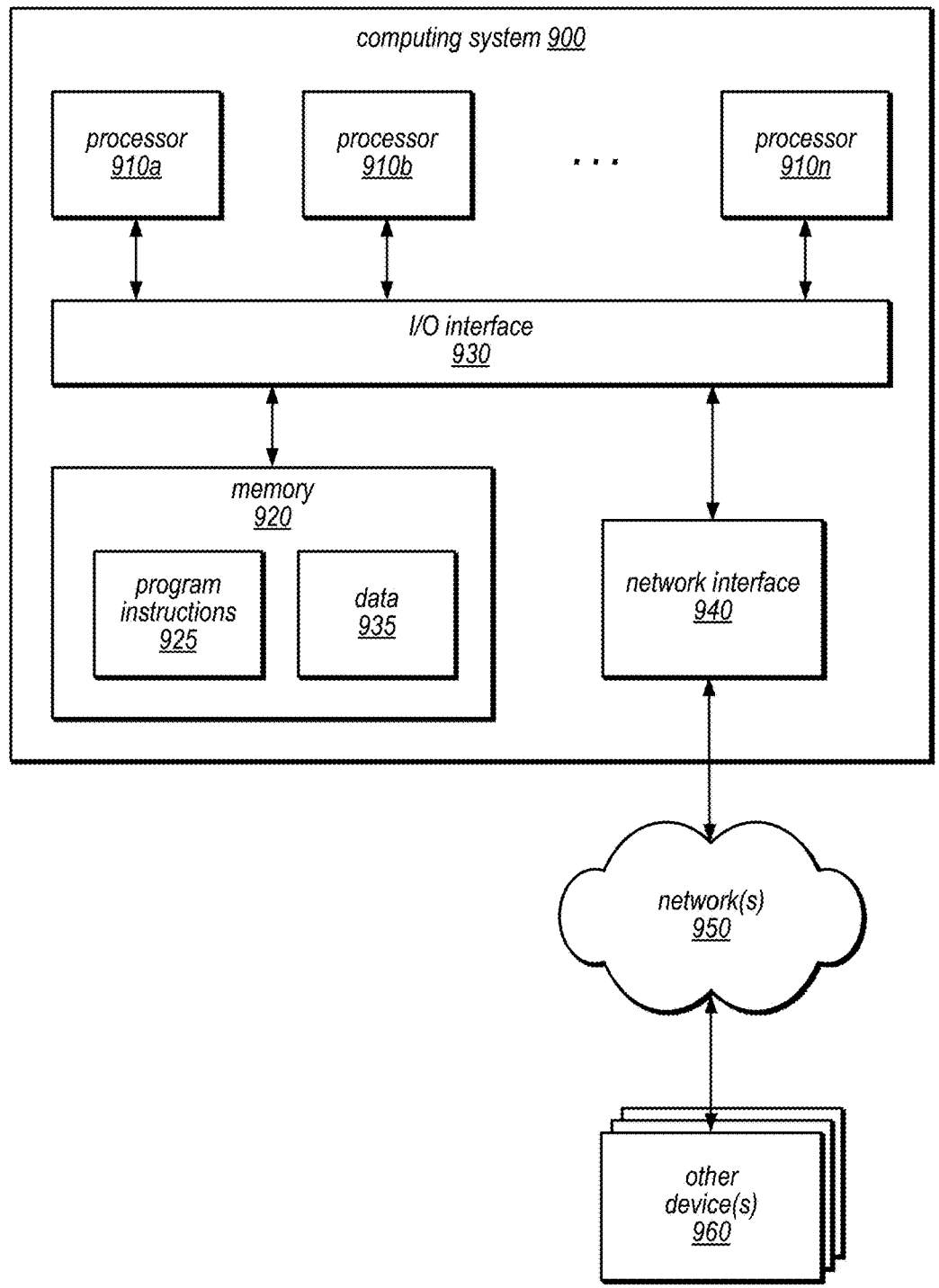
FIG. 9 is a block diagram illustrating an example computer system that can be used to implement one or more portions of a distributed computing system that implements a gossip protocol that employs changing probabilistic data structure generation functions, according to some embodiments.

FIG. 9 is a block diagram illustrating an example computer system that can be used to implement one or more portions of a storage system that employs an auto-partitioning secondary index, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a distributed computing system comprising a plurality of nodes, each implemented by one or more processors and associated memory, wherein:
each node stores a data set of data items and uses a gossip protocol to synchronize its data set with data sets of other nodes of the plurality of nodes; and
during each round of the gossip protocol, each node is configured to:
select another node of the plurality of nodes to gossip with;
determine a set of hash functions to be used in the round to generate a space-efficient probabilistic data structure (SEPDS) that reflects a content of its data set, wherein the set of hash functions changes from round to round;
generate the SEPDS from its data set using the set of hash functions; and
perform a synchronization operation with the other node using the SEPDS.

2. The system of claim 1, wherein:
to determine the set of hash functions, each node is configured to:
determine a set of independent base hash functions; and
derive the set of hash functions based on the independent hash functions.

3. The system of claim 1, wherein:
the SEPDS comprises a bloom filter; and
to generate the bloom filter, each node is configured to:
hash a data item in its data set using each hash function in the set to determine different locations in the bloom filter, wherein the result of each hash function in the set is assigned to modify locations in different portion of the bloom filter; and
modify the bloom filter at the determined locations to reflect the data item.

4. The system of claim 1, wherein:
to perform the synchronization operation, each node is configured to:
send the SEPDS to the other node;
receive data items from the other node that are not present in the SEPDS and
update its data set with the received data items.

5. The system of claim 1, wherein the other node is configured to:
responsive to receiving the SEPDS from the node:
determine the set of hash functions;
perform one or more probabilistic queries on the SEPDS using the set of hash functions to determine data items in the its data set that are not present in the SEPDS; and
send the data items to the node.

6. A method comprising:
performing a synchronization of data sets in a distributed computing system using a gossip protocol, wherein the distributed computing system comprises a plurality of nodes implemented by one or more processors and associated memory, and each node performs, during each round of the gossip protocol:
selecting another node in the plurality of nodes to gossip with;
determining a set of hash functions to be used for the round to generate a space-efficient probabilistic data structure (SEPDS) that reflects a content of its data set, wherein the set of hash functions changes from round to round;
generating the SEPDS from its data set using the set of hash functions; and
performing a synchronization operation with the other node using the SEPDS.

7. The method of claim 6, wherein the SEPDS comprises a bloom filter, and generating the bloom filter comprises:
hashing a data item in the first node's data set using each hash function in the set to determine locations in the bloom filter; and
modifying the bloom filter at the determined locations to reflect the data item.

8. The method of claim 7, wherein each hash function is assigned to modify a different portion of the bloom filter.

9. The method of claim 6, wherein performing the synchronization operation comprises:
sending the SEPDS to the other node, wherein the SEPDS includes a plurality of data items, each data item including a record identifier of a record from the node's data set and a latest version identifier of the record;
receiving a discrepancy list from the other node including record identifiers and corresponding latest version identifiers in a data set of the other node that are not present in the SEPDS;
determining, from the discrepancy list, a first set of records for which the node has a later version, or a second set of records for which the other node has a later version; and
sending to the other node record data for records in the first set, or a request to obtain record data for records in the second set.

10. The method of claim 6, wherein performing the synchronization operation comprises receiving two independent base hash functions from a different node of the distributed computing system, wherein the two independent base hash functions are used to derive the set of hash functions used to generate the SEPDS.

11. The method of claim 6, wherein performing the synchronization operation comprises:
sending the SEPDS to the other node;
receiving data items from the other node that are not present in the SEPDS and
updating its data set with the received data items.

12. The method of claim 6, further comprising:
performing, by the other node:
performing one or more probabilistic queries on the SEPDS using the set of hash functions to determine data items in the other node's data set that are missing from the SEPDS;
generating a second SEPDS from the other node's data set using the set of hash functions; and
sending the missing data items and the second SEPDS to the node.

13. The method of claim 6, wherein selecting another node in the plurality of nodes to gossip with comprises selecting a different node at least partly in a pseudo-random fashion.

14. The method of claim 6, wherein performing the synchronization of data sets comprises:
prior to the generation of the SEPDS by each node:
determining a schedule of different hash functions to use for different rounds of the gossip protocol; and
providing the schedule to the plurality of nodes.

15. The method of claim 6, wherein:
the data set includes a set of node events; and
generating the SEPDS comprises generating the SEPDS from a subset of node events in the data set that occurred since a last time cutoff.

16. The method of claim 6, wherein generating the SEPDS comprises generating the SEPDS from a subset of data items in the data set that were learned during a number of most recent rounds.

17. A non-transitory computer-accessible storage medium storing program instructions that when executed on one or more processors of a first node in a distributed computing system implemented by a plurality of nodes, cause the first node to:
exchange communications via a gossip protocol with other nodes in the plurality of nodes to synchronize a data set stored by the first node with data sets stored by the other nodes, wherein, during a given round of the gossip protocol, the program instructions when executed cause the first node to:
determine a set of hash functions for the round, wherein the set of hash functions changes from round to round;
generate a space-efficient probabilistic data structure (SEPDS) that reflects a content of the data set using the set of hash functions;
send the SEPDS to a second node of the plurality of nodes;
receive from the second node one or more data items that are missing from the SEPDS; and
update the data set with the received data items.

18. The non-transitory computer-accessible storage medium of claim 17, wherein the program instructions when executed on the one or more processors of the first node cause the first node to:
during the given round of the gossip protocol:
receive another SEPDS from a third node of the plurality of nodes;
perform one or more probabilistic queries on the other SEPDS using the set of hash functions to determine data items in the data set that are missing from the other SEPDS; and
send the missing data items to the third node.

19. The non-transitory computer-accessible storage medium of claim 17, wherein to determine a set of hash functions for the round, the program instructions when executed on the one or more processors of the first node cause the first node to:
determine two independent base hash functions including a first base function and a second base function; and
derive the set of hash functions based on the two base functions, wherein the derivation comprises, for each hash function in the set, adding the first base function to a product of the second base function and a different coefficient.

20. The non-transitory computer-accessible storage medium of claim 17, wherein:
the SEPDS comprises a bloom filter; and
to generate the bloom filter, the program instructions when executed on the one or more processors of the first node cause the first node to:
hash a data item in its data set using each hash function in the set to determine different locations in the bloom filter, wherein the result of each hash function in the set is assigned to modify locations in a different portion of the bloom filter; and
modify the bloom filter at the determined locations to reflect the data item.

* * * * *